US009378673B2

United States Patent
Oh et al.

(10) Patent No.: US 9,378,673 B2
(45) Date of Patent: Jun. 28, 2016

(54) ORGANIC LIGHT EMITTING DISPLAY DEVICE AND DRIVING METHOD THEREOF

(71) Applicant: LG DISPLAY CO., LTD., Seoul (KR)

(72) Inventors: Dongkyoung Oh, Gumi-si (KR); Sangho Yu, Paju-si (KR); Hyunson Chon, Seoul (KR); Myungjin Pyeon, Paju-si (KR); Youngin Kim, Goyang-si (KR); Munjun Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/591,645

(22) Filed: Jan. 7, 2015

(65) Prior Publication Data
US 2015/0115799 A1    Apr. 30, 2015

Related U.S. Application Data

(62) Division of application No. 13/718,739, filed on Dec. 18, 2012, now Pat. No. 8,946,994.

(30) Foreign Application Priority Data

Sep. 25, 2012  (KR) .......................... 10-2012-0106563
Sep. 25, 2012  (KR) .......................... 10-2012-0106565

(51) Int. Cl.
| H05B 37/00 | (2006.01) |
| H05B 41/00 | (2006.01) |
| G09G 3/32  | (2016.01) |
| H05B 37/02 | (2006.01) |
| G09G 3/00  | (2006.01) |

(52) U.S. Cl.
CPC ................. *G09G 3/3208* (2013.01); *G09G 3/00* (2013.01); *G09G 3/006* (2013.01); *H05B 37/02* (2013.01); *G09G 2330/028* (2013.01); *G09G 2330/10* (2013.01); *G09G 2330/12* (2013.01); *Y02B 20/42* (2013.01)

(58) Field of Classification Search
None
See application file for complete search history.

(56) References Cited

U.S. PATENT DOCUMENTS

| 9,058,773 B2 * | 6/2015 | Park |
| 2007/0195025 A1 | 8/2007 | Korcharz et al. |
| 2008/0143655 A1 | 6/2008 | Ko |
| 2009/0225021 A1* | 9/2009 | Ye et al. .................. 345/102 |
| 2010/0073275 A1 | 3/2010 | Kim |
| 2012/0127213 A1 | 5/2012 | Park |
| 2012/0146520 A1 | 6/2012 | Liu et al. |

FOREIGN PATENT DOCUMENTS

| DE | 10 2006 056 148 A1 | 6/2008 |
| KR | 10-2010-0047063 A | 5/2010 |
| KR | 10-2011-0138466 A | 12/2011 |
| KR | 10-2012-0055436 A | 5/2012 |

* cited by examiner

*Primary Examiner* — Anh Tran
(74) *Attorney, Agent, or Firm* — Birch, Stewart, Kolasch & Birch, LLP

(57) ABSTRACT

An organic light emitting display device, can include a panel, a driving unit driving the panel, a timing controller controlling the driving unit, a power supply supplying power to the panel, a current detection unit detecting a current flowing through power line wiring of the panel and outputting the detected currents, and a power controller comparing the detected current with a current value configured internally and outputting a shutdown signal which turns off the power supply if the detected current exceeds the predetermined current value.

11 Claims, 24 Drawing Sheets

ORGANIC LIGHT EMITTING DISPLAY DEVICE AND DRIVING METHOD THEREOF

CROSS-REFERENCE TO RELATED APPLICATIONS

This application is a Divisional of co-pending U.S. patent application Ser. No. 13/718,739 filed Dec. 18, 2012, which claims priority to Korean Patent Application Nos. 10-2012-0106563 filed Sep. 25, 2012 and 10-2012-0106565 filed Sep. 25, 2012, all of which are hereby incorporated by reference, as if they are fully set forth herein.

BACKGROUND OF THE INVENTION

1. Technical Field

This document relates to an organic light emitting display device and a driving method of the device.

2. Background Art

An organic light emitting element used for an organic light emitting display device refers to a self-light emitting element in which a light emitting layer is formed between two electrodes on the substrate of the device. Organic light emitting display devices are classified into top-emission type, bottom-emission type, dual-emission type, and so on according to a direction along which light is emitted. Alternatively, organic light emitting devices can be divided into passive matrix type and active matrix type according to a driving method employed.

A sub-pixel disposed in an organic light emitting display panel comprises a transistor unit including a switching transistor, a driving transistor, and a capacitor; and an organic light emitting diode including a lower electrode connected to the driving transistor included in the transistor unit, an organic light emitting layer; and an organic light emitting diode including a upper electrode.

An organic light emitting display panel exhibits light intensity varying in proportion to the amounts of a current flowing through the organic light emitting diode. Since organic light emitting display panels require a large amount of current compared with liquid crystal display panels, in the event of short circuit at power terminals, an excessive amount of current flows into the elements of the respective sub-pixels. Various factors cause short circuit at power terminals, which include not only internal, structural factors such as particles introduced into the organic light emitting display panel during a manufacturing process (or a module process), cracks, misalignment of pad units, and narrow wiring layout but also external factors such as static electricity.

If an excessive current flows into a sub-pixel due to short circuit at power terminals, elements of the corresponding sub-pixel are burnt out. Burning out in a small region may not be perceived at its early stage but neighboring sub-pixels are gradually burnt out as the organic light emitting display panel continues to operate.

In this respect, there are high chances short circuit at power terminals burns out sub-pixels of an organic light emitting display panel and subsequently leads to a fire; therefore, a means for preventing short circuit has to be provided.

SUMMARY OF THE INVENTION

The present invention has been made in an effort to provide an organic light emitting display device comprising a panel; a driving unit driving the panel; a timing controller controlling the driving unit; a power supply supplying power to the panel; a current detection unit detecting a current flowing through power line wiring of the panel and outputting the detected current; and a power controller comparing the detected current with a current value configured internally and outputting a shutdown signal which turns off the power supply if the detected current exceeds the predetermined current value.

Another aspect of the present invention provides an organic light emitting display device comprising a panel including power line wiring wired up for individual blocks; a driving unit driving the panel; a timing controller controlling the driving unit; a power supply supplying power to the panel; a current detection unit detecting a current flowing through the power line wiring of each block and outputting the detected current of the block; and a power controller comparing detected currents of the individual blocks with each other and outputting a shutdown signal which turns off the power supply if a current higher or lower than the currents of the other blocks is detected.

BRIEF DESCRIPTION OF THE DRAWINGS

The accompany drawings, which are included to provide a further understanding of the invention and are incorporated on and constitute a part of this specification illustrate embodiments of the invention and together with the description serve to explain the principles of the invention.

DETAIL DESCRIPTION OF THE INVENTION

Reference will now be made in detail embodiments of the invention examples of which are illustrated in the accompanying drawings.

In what follows, preferred embodiments of the present invention will be described in detail with reference to appended drawings.

<First embodiment>

Figure 1:
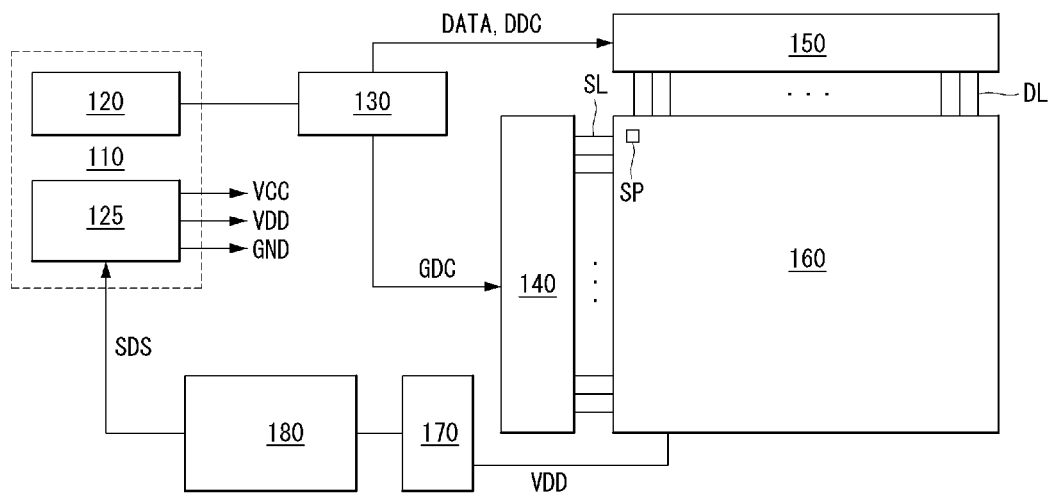
FIG. 1 is a block diagram of an organic light emitting display device according to the present invention.
Figure 2:
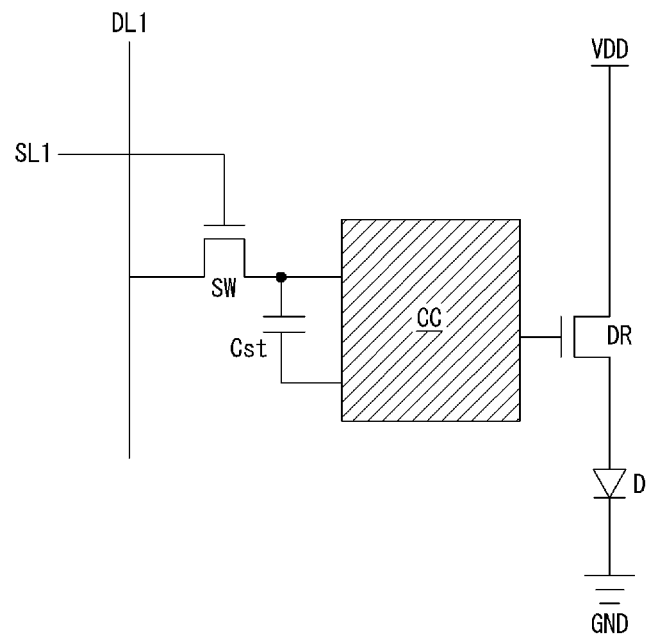
FIG. 2 is a circuit diagram of a sub-pixel.

As shown in FIGS. 1 and 2, an organic light emitting display device comprises an image processing unit 120, a power supply 125, a timing controller 130, a data driving unit 150, a scan driving unit 140, a panel 160, a current detection unit 170, and a power controller 180.

An image processing unit 120 provides a timing controller 130 with a vertical synchronization signal (Vsync), a horizontal synchronization signal (Hsync), a data enable signal (DE), a clock signal (CLK), and a data signal (DATA). The image processing unit 120 is formed in a system board 110.

The timing controller 130 controls an operation timing of the data driving unit 150 and the scan driving unit 140 by using timing signals such as the vertical synchronization signal (Vsync), the horizontal synchronization signal (Hsync), the data enable signal (DE), and the clock signal (CLK). Since the timing controller 130 is capable of determining a frame interval by counting the data enable signal (DE) during one horizontal interval, the vertical synchronization signal (Vsync) and the horizontal synchronization signal (Hsync) provided from the outside can be omitted. Control signals generated at the timing controller 130 include a gate timing control signal (GDC) for controlling the operational timing of the scan driving unit 140 and a data timing control signal (DDC) for controlling the operational timing of the data driving unit 150. The gate timing control signal (GDC) includes a gate start pulse, a gate shift clock, and a gate output enable signal. The data timing control signal (DDC) includes a source start pulse, a source sampling clock, and a source output enable signal.

The scan driving unit 140 shifts the level of a gate driving voltage in response to the gate timing control signal (GDC) provided from the timing controller 130 and generates a scan signal in a sequential manner. The scan driving unit 140 provides a scan signal through scan lines (SL) connected to sub-pixels (SPs) included in the panel 160.

The data driving unit 150 performs sampling of the data signal (DATA) provided from the timing controller 130 in response to the data timing control signal (DDC) provided from the timing controller 130 and latches on the sampled data signal and transforms the latched, sampled data signal into the data of a parallel data system. The data driving unit 150 transforms the data signal (DATA) into a gamma reference voltage. The data driving unit 150 provides the data signal (DATA) through the data lines (DLs) connected to sub-pixels (SPs) included in the panel 160.

The panel 160 comprises sub-pixels disposed in the form of a matrix. Sub-pixels consist of red, green, and blue sub-pixels; in some cases, white sub-pixels are included. A panel 160 incorporating white sub-pixels can emit white light even if light emitting layers of individual sub-pixels do not emit red, green, and blue light. In this case, the white light is converted into red, green, and blue light by an RGB color filter.

Meanwhile, sub-pixels included in the panel 160 may be comprised as shown in FIG. 2. One sub-pixel comprises a switching transistor SW, a driving transistor DR, a capacitor Cst, a compensation circuit CC, and an organic light emitting diode D. The switching transistor (SW) performs a switching operation in such a way that a data signal provided through a first data line DL1 in response to a scan signal provided through a first scan line SL1 is stored in the capacitor as a data voltage. The driving transistor DR operates to have a driving current flow between a first power line wiring VDD and the ground GND. The compensation circuit CC compensates for a threshold voltage of the driving transistor DR. The compensation circuit CC comprises one or more transistor and capacitor. The compensation circuit CC can be implemented in various ways; specific descriptions and examples of the compensation circuit are not provided furthermore. The organic light emitting diode D operates to emit light according to a driving current developed by the driving transistor DR.

One sub-pixel is formed to have a 2T (Transistor) 1C (Capacitor) structure comprising a switching transistor SW, a driving transistor DR, a capacitor Cst, and an organic light emitting diode D. In case a compensation circuit CC is further incorporated, the sub-pixel may form a 3T1C, 4T2C, or 5T2C structure. A sub-pixel having the structure above can form a top-emission type, bottom-emission type, or dual-emission type depending on a structure employed.

The power supply 125 converts an external voltage supplied from the outside into a first voltage (for example, 20 V level), a second voltage (for example, 3.3V level), and a low voltage (for example, 0 V level), and so on. The first voltage, being supplied to a first power line wiring VDD, is a drain level voltage; the second voltage, being supplied to a second power line wiring VCC, is a collector level voltage; and the low level voltage is supplied to the ground GND and is a base level voltage. The power supply 125 is formed in the system board 110 together with the image processing unit 120. The output voltage of the power supply 125 is used for the image processing unit 120, the timing controller 130, the data driving unit 150, the scan driving unit 140, and the panel 160.

The current detection unit 170 detects a current flowing into the panel 160 through the first power line wiring VDD and outputs the detected current. The current detection unit 170 detects a current flowing into the panel 160 through the first power line wiring VDD and provides the detected current to the power controller 180. The current detection unit 170 can be realized with conventional OP amps and the detected current may be an analog value but the present invention is not limited to the above.

The power controller 180 generates a shutdown signal SDS according to a current detected by the current detection unit 170. The power controller 180 outputs the shutdown signal SDS when the detected current reaches an overcurrent, thereby turning off the power supply 125. In other words, the whole output of the power supply 125 is shut down.

The current detection unit 170 and the power controller 180 described earlier comprise a short detection circuit which detects occurrence of short circuit at the power supply and in the event of short circuit, turns off the power supply 125. Various factors cause short circuit at power terminals, which include not only internal, structural factors such as particles introduced into the panel 160 during manufacturing process (or module process), cracks, misalignment of pad units, and narrow wiring layout; but also external factors such as static electricity.

If an excessive current flows into a sub-pixel due to short circuit at power terminals, elements of the corresponding sub-pixel are burnt out. Burning out in a small region may not be perceived at its early stage but neighboring sub-pixels are gradually burnt out as the panel 160 continues to operate. To prevent the above problem, the short detection circuit controls the power supply 125 in such a way to remove the possibility of generating a fire at the panel 160, where specific descriptions thereof are given below.

In this respect, there are high chances short circuit at power terminals burns out sub-pixels of an organic light emitting display panel and subsequently leads to a fire; therefore, a means for preventing the short circuit has to be provided.

In what follows, an organic light emitting display device according to the present invention will be described in more detail.

<First embodiment>

Figure 3:
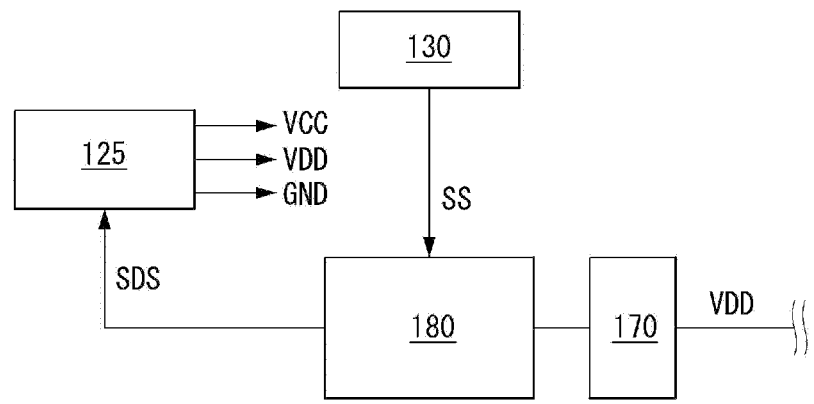
FIG. 3 is a block diagram of a power supply controller according to a first embodiment of the present invention.

As shown in FIG. 3, the circuit for controlling the power supply 125 comprises a timing controller 130, a current detection unit 170, and a power controller 180.

The current detection unit 170 detects a current flowing through a first power line wiring VDD and supplies the detected current to the power controller 180. The current detection unit 170 detects a current flowing through the first power line wiring VDD periodically or aperiodically. If the current detection unit 170 detects a current flowing through the first power line wiring VDD regularly and it is not controlled by a particular device, it can be implemented by using OP amps. On the other hand, if the current detection unit 170 detects a current flowing aperiodically through the first power line wiring VDD and it is controlled by a particular device, it can be implemented by using OP amps and switches. In this case, a switch detects a current in accordance with a control signal. Meanwhile, the current detection unit 170 may further comprise an analog-to-digital converter according to the structure of the power controller. At this time, the analog-to-digital converter converts an analog current value to a digital current value and displays the converted current.

The timing controller 130 provides a sensing signal SS to the power controller 180. The timing controller 130 can not only provide a panel with sensing data through a data driving unit periodically but also provide the power controller 180 with the sensing signal SS in order for the power controller 180 to operate in synchronization with a timing at which the sensing data is displayed. On the other hand, the timing controller 130 can provide the sensing signal SS to the power controller 180 in order for the power controller 180 to operate for blank intervals excluding an image display interval of the panel.

The power controller 180 receives a detected current from the current detection unit 170 and compares the detected current with an internally set current value. If the detected current exceeds the specified current value, a shutdown signal SDS is output and turns off the power supply 125.

Meanwhile, if a physical distance between the power supply 125 and the power controller 180 is rather long (in other words, in case a transmission path is long or a transmission method is different), the strength of the shutdown signal SDS output from the power controller 180 may be weakened. Similarly, due to a difference between the circuit of the power controller 180 and that of the power supply 125, logic level of the shutdown signal SDS may be changed. To compensate for this change, the power controller 180 may be comprised as described below.

Figure 4:
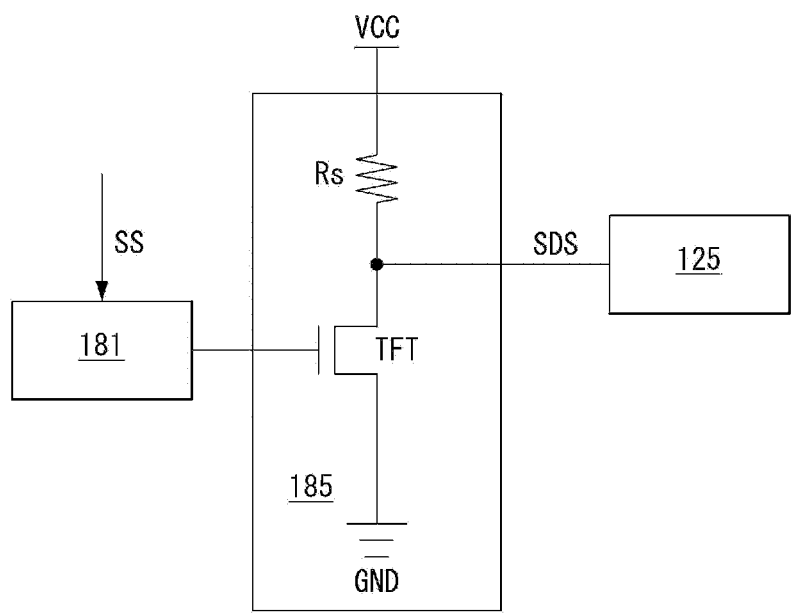
FIG. 4 is a first circuit diagram illustrating a power controller.
Figure 5:
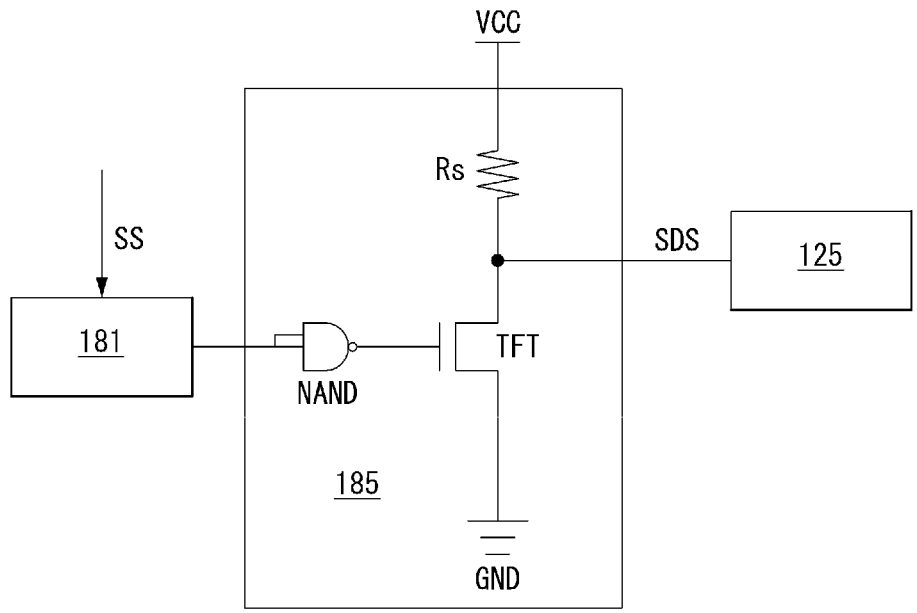
FIG. 5 is a second circuit diagram illustrating a power controller.

As shown in FIGS. 4 and 5, the power controller comprises an analysis unit 181 and a shutdown signal generation unit 185. At this time, the analysis unit 181 and the shutdown signal generation unit 185 can be formed in the same board together with the timing controller. Similarly, the analysis unit 181 may be formed in the same board together with the timing controller while the shutdown signal generation unit 185 may be formed in the same board together with the power supply 125.

The analysis unit 181 receives a detected current value from the current detection unit 170 and compares the detected current value with an internally set current value and outputs a digital pulse if the values are different from each other. The shutdown signal generation unit 185 generates a shutdown signal SDS by using a digital pulse output from the analysis unit 181.

As an example, the shutdown generation unit 185 comprises a resistor Rs and a transistor TFT as shown in FIG. 4. One end of the resistor Rs is connected to a second power line wiring VCC (which can be connected to the first power line wiring VDD, too) and the other end is connected to a first electrode (for example, a drain) of the transistor TFT. The gate electrode of the transistor TFT is connected to a digital pulse output port of the analysis unit 181; the first electrode is connected to the other end of the resistor Rs and a signal input port of the power supply 125; and a second electrode (for example, a source) is connected to the ground wiring GND.

As can be shown from FIG. 4, since the transistor TFT maintains a turn-off state when the digital pulse output from the analysis unit 181 is a logic low level, a shutdown signal SDS corresponding to the level of a second voltage provided to the second power line wiring VCC is output. Meanwhile, if the digital pulse output from the analysis unit 181 is a logic high level, the transistor TFT maintains a turn-on state and a shutdown signal SDS corresponding to the level of a low voltage provided to the ground wiring GND is output.

For example, if the power supply 125 is turned off by the shutdown signal SDS corresponding to the logic low level, the power supply 125 is turned off even if the digital pulse output from the analysis unit 181 becomes the logic high level. Different from the above example, if the power supply 125 is turned off by the shutdown signal SDS corresponding to the logic high level, the power supply is turned off even if the digital pulse output from the analysis unit 181 becomes the logic low level. At this time, it should be noted that even if level of the digital pulse output from the analysis unit 181 changes, it is compensated by the transistor TFT constituting the shutdown signal generation unit 185 and a power supply connected to the transistor TFT.

As another example, the shutdown signal generation unit 185 comprises a NAND gate (or an inverter), a resistor Rs, and a transistor TFT, as shown in FIG. 5. Two input ports of the NAND gate are connected to a digital pulse output port of the analysis unit 181 and the output of the NAND gate is connected to the gate electrode of the transistor TFT. One end of the resistor Rs is connected to a second power line wiring VCC (which can be connected to the first power line wiring VDD, too) and the other end is connected to a first electrode (for example, the drain) of the transistor TFT. The gate electrode of the transistor TFT is connected to the output port of the NAND gate; the first electrode is connected to the other end of the resistor Ts and a signal input port of the power supply 125; and the second electrode (for example, the source) is connected to the ground wiring GND.

As can be shown from FIG. 5, since the transistor TFT maintains a turn-off state when the digital pulse output from the analysis unit 181 is a logic high level, a shutdown signal SDS corresponding to the level of a second voltage provided to the second power line wiring VCC is generated. Meanwhile, if the digital pulse output from the analysis unit 181 is a logic low level, the transistor TFT maintains a turn-on state and a shutdown signal SDS corresponding to the level of a low voltage provided to the ground wiring GND is generated.

For example, if the power supply 125 is turned off by the shutdown signal SDS corresponding to the logic low level, the power supply 125 is turned off even if the digital pulse output from the analysis unit 181 becomes the logic low level. Different from the above example, if the power supply 125 is turned off by the shutdown signal SDS corresponding to the logic high level, the power supply is turned off even if the digital pulse output from the analysis unit 181 becomes the logic high level. At this time, it should be noted that even if level of the digital pulse output from the analysis unit 181 changes, it is compensated by the transistor TFT constituting the shutdown signal generation unit 185 and a power supply connected to the transistor TFT.

The configurations shown in FIGS. 4 and 5 described above are valid when the transmission path (in other words, an interface) between the analysis unit 181 and shutdown signal generation unit 185 employs the miniLVDS interface.

In what follows, operation states of the power controller 180 and the power supply 125 according to control of the timing controller will be described.

As shown in FIGS. 1 to 8, the timing controller 130 provides a sensing signal SS to the power controller 180 in order for the power controller 180 to operate in the blank intervals VB excluding the image display interval (1 frame) of the panel 160. The blank interval VB refers to a vertical blank formed between vertical synchronization signals Vsync identifying frames. The "DE" not explained refers to a data enable signal and "DATA" refers to a data signal output from the timing controller 130.

While maintaining the sensing signal SS at logic low during the image display interval (1 frame), the timing controller 130 converts the sensing signal SS to logic high H during the blank interval VB. The power controller 180 can determine whether the current detection unit 170 detects an overcurrent in response to the sensing signal SS of logic high H. At this time, a criterion for determining the occurrence of an overcurrent, as described earlier, employs a method of comparing a detected current with an internally set current value.

If a detected current value corresponds to "Ab(A)" which is larger than a predetermined current value "N(A)", it indicates an abnormal state where an overcurrent is detected and the power controller 180 outputs a shutdown signal SDS. Since the power supply 125 is turned off in response to the shutdown signal SDS, an output voltage of the output port Vout of the power supply is cut off. On the other hand, if a detected current value is similar to or the same as the predetermined current value "N(A)", it indicates a normal state where an overcurrent is not detected and the power supply 125 outputs an output voltage through the output port Vout.

Meanwhile, in case the current detection unit 170 consists only of passive elements, the current detection unit 170 continuously detects and outputs a current flowing through the power line wiring VDD, independently of the sensing signal SS driving the power controller 180. However, in case the current detection unit 170 comprises active and passive elements at the same time, the current detection unit 170, in the same manner as the power controller 180, detects and outputs a current flowing through the power line wiring VDD for a blank interval excluding the image display interval (1 frame) of the panel.

As described above, in case the timing controller 130 outputs a sensing signal SS driving the power controller 180 only for the blank interval VB, a current value detection time is very short compared with "T2" as can be seen from the period of "T1". Therefore, instead of generating a one-off sensing signal SS driving the power controller 180, the timing controller 130 may generate continuously N (where N is an integer two or more) sensing signals SS1, SS2 driving the power controller 180 for each blank interval VB.

The timing controller 130 not only periodically provides the panel 160 through the data driving unit 150 with sensing data stored internally but also provides a sensing signal SS to the power controller 180 in order for the power controller 180 to operate in synchronization with a timing at which the sensing data is displayed. Sensing data has been described with reference to black data representing a black color but is not limited to the above, which may comprise data requiring a small amount of data for image display. For example, sensing data can be displayed when a screen protector is used, a screen protector is displayed on the panel 160, or the whole image displayed on the panel 160 is converted into another image but the present invention is not limited to the above examples.

The timing controller 130 maintains the sensing signal SS at logic low L during an image display interval (1 frame) but converts the sensing signal SS to logic high H during which the sensing data such as black data is displayed. The power controller 180 can detect whether a current value corresponding to an overcurrent has occurred from the current detection unit 170 in response to the sensing signal SS of logic high H. At this time, a criterion for determining the occurrence of an overcurrent, as described earlier, employs a method of comparing a detected current with an internally set current value.

If a detected current value corresponds to "Ab(A)" which is larger than a predetermined current value "N(A)", it indicates an abnormal state where an overcurrent is detected and the power controller 180 outputs a shutdown signal SDS. Since the power supply 125 is turned off in response to the shutdown signal SDS, an output voltage of the output port Vout of the power supply is cut off. On the other hand, if a detected current value is similar to or the same as the predetermined current value "N(A)", it indicates a normal state where an overcurrent is not detected and the power supply 125 outputs an output voltage through the output port Vout.

Meanwhile, in case the current detection unit 170 consists only of passive elements, the current detection unit 170 continuously detects and outputs a current flowing through the power line wiring VDD, independently of the sensing signal SS driving the power controller 180. However, in case the current detection unit 170 comprises active and passive elements at the same time, the current detection unit 170, in the same manner as the power controller 180, detects and outputs a current flowing through the power line wiring VDD for an interval during which sensing data such as black data is displayed on the panel 160.

As described above, in case the timing controller 130 outputs a sensing data and a sensing signal SS operating the power controller 180 in synchronization with a timing at which the sensing data is displayed, as can be noticed from the period of "T2", an advantageous effect is obtained that a current value detection time becomes long compared with "T1".

Figure 9:
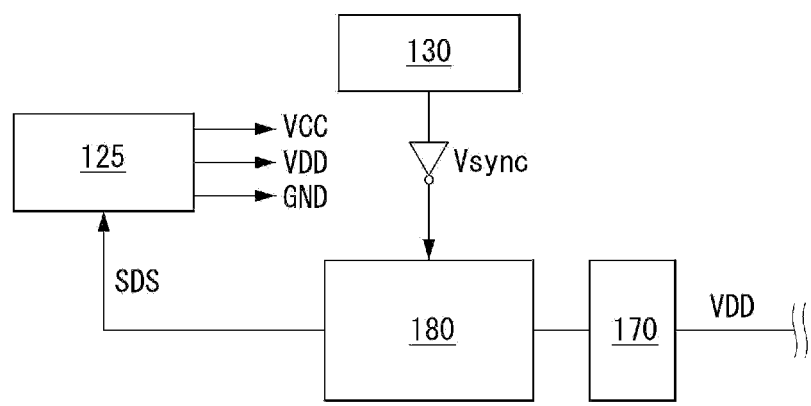
FIG. 9 is a block diagram of a power supply controller according to a modified example of a first embodiment.

As shown in FIG. 9, a circuit controlling the power supply 125 comprises a timing controller 130, a current detection unit 170, and a power controller 180. A power controller 180 according to a modified example includes an inverter INV between the timing controller 130 and the power controller 180.

Figure 6:
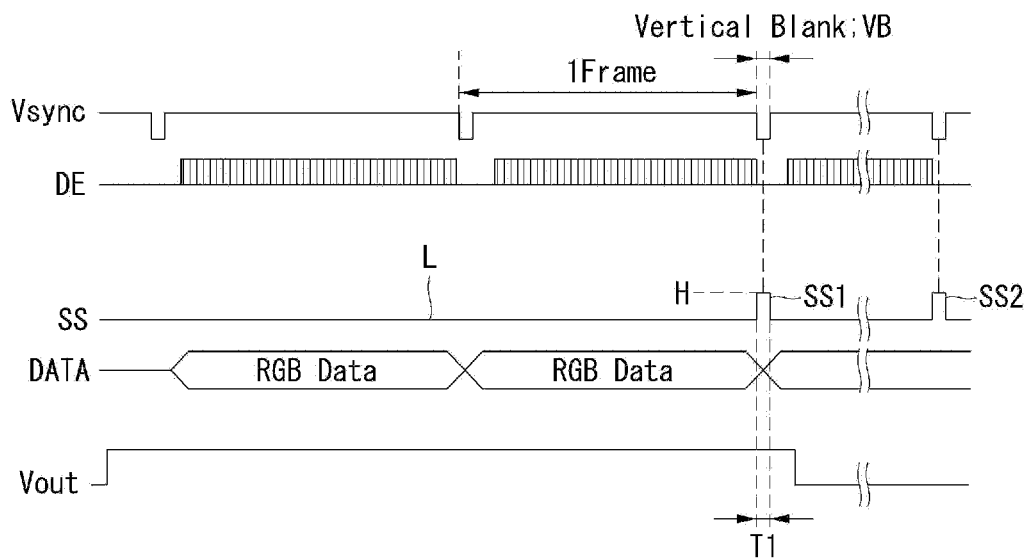
FIG. 6 is a waveform diagram illustrating operation of a power controller and a power supply in response to a blank interval.
Figure 7:
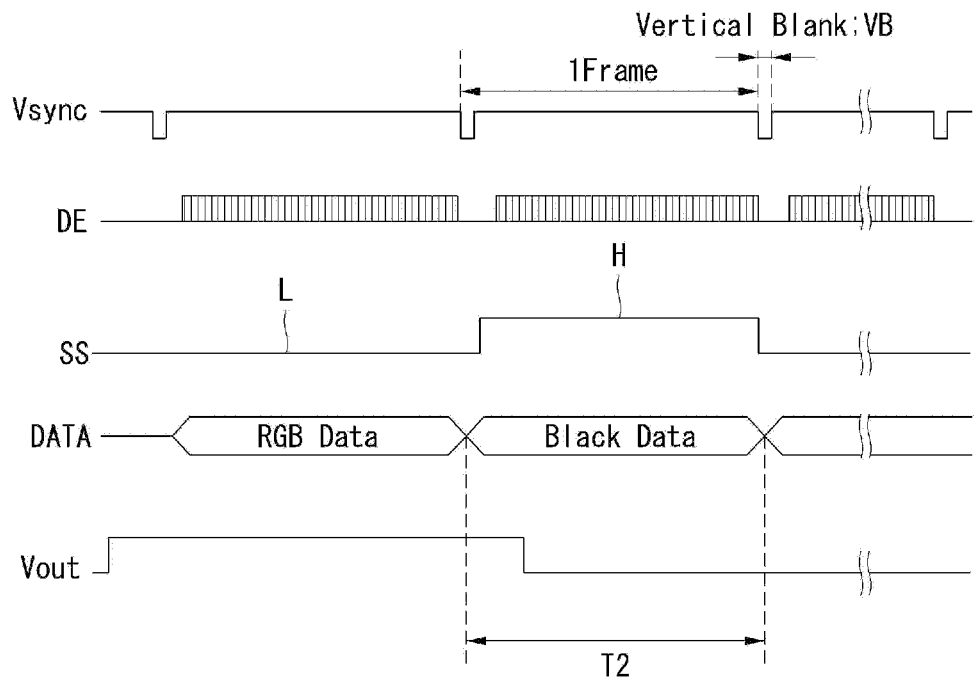
FIG. 7 is a waveform diagram illustrating operation of a power controller and a power supply in response to an interval for which sensing data are provided.
Figure 8:
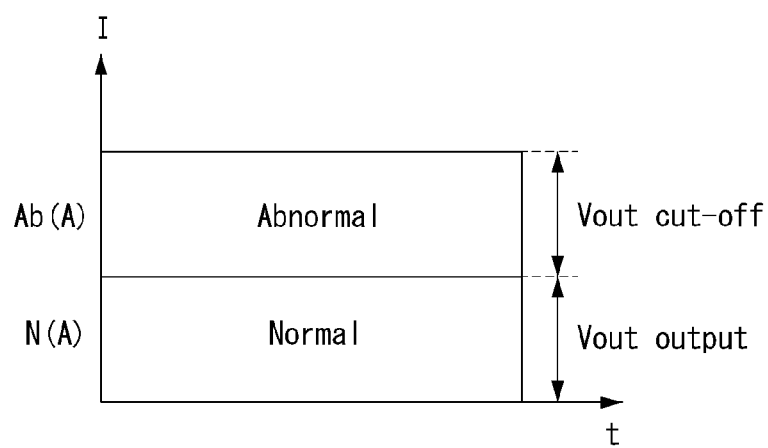
FIG. 8 illustrates output states of a power supply according to a comparison result between a detected current value and a configured current value.

Although the structure of FIG. 3 assumes that the timing controller 130 generates a separate sensing signal SS, the structure of FIG. 9 can be used when the timing controller 130 is equipped with a port generating a vertical synchronization signal Vsync. The inverter INV inverts the vertical synchronization signal Vsync and outputs a logic high level during the "VB" interval of FIG. 6. Therefore, the structure of FIG. 9, by employing the inverter INV, can control the power controller 180 and the power supply 125 as shown in FIG. 6.

Meanwhile, the method as shown in FIG. 9 controls the power controller 180 and the power supply 125 during the "VB" interval. When the timing controller 130 does not have an output port for the vertical synchronization signal Vsync, a data enable signal DE output from the timing controller 130 may be utilized. To this purpose, a counter circuit may be installed between the timing controller 130 and the power controller 180 instead of the inverter INV; the enable signal DE is counted by using the counter circuit; and the "VB" interval is detected and used as the sensing signal SS.

The first embodiment described above can be applied to the structure where the first power line wiring VDD in the panel 160 is connected to each other. The first embodiment can be implemented by employing an organic light emitting display device as described below.

Figure 10:
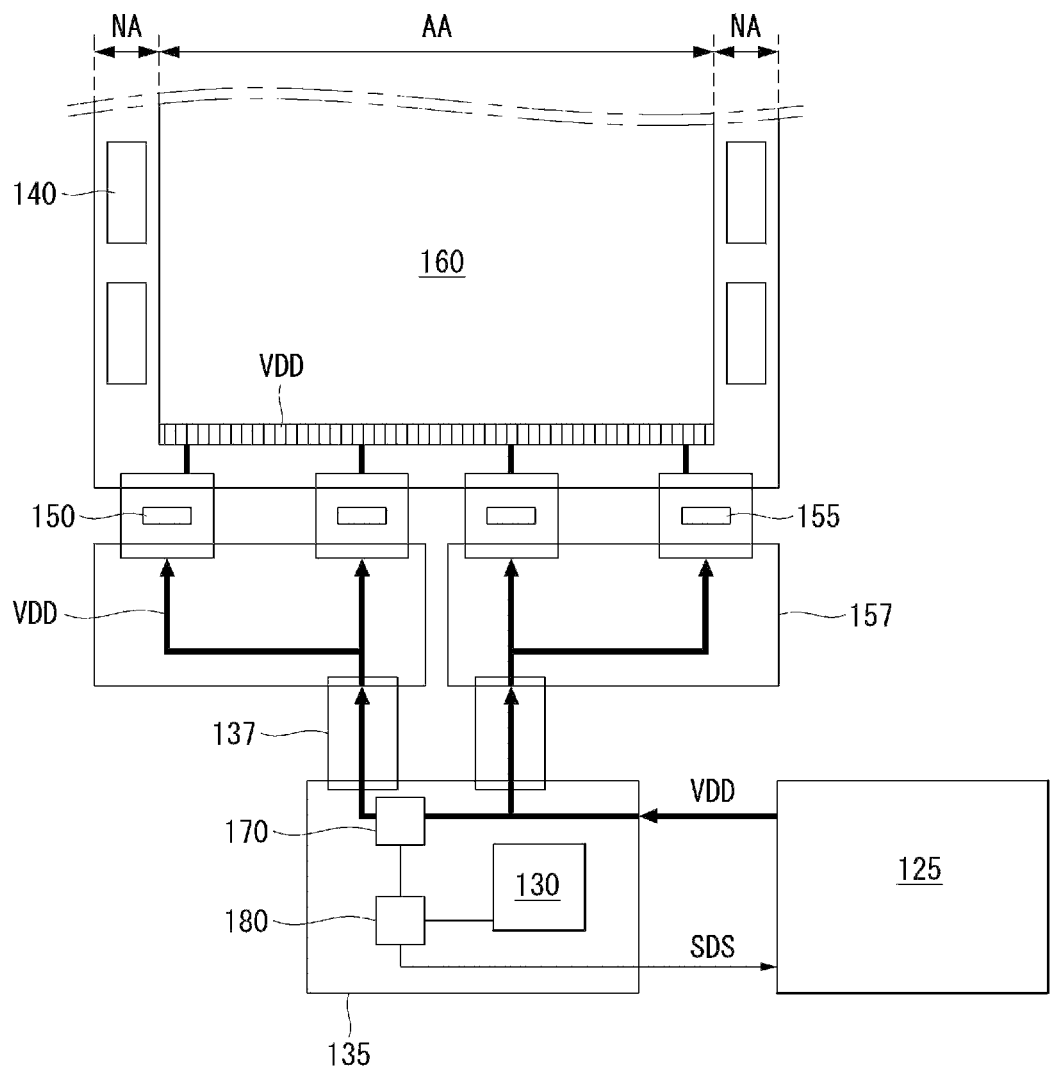
FIG. 10 illustrates an organic light emitting display device implemented according to a first embodiment of the present invention.

As shown in FIG. 10, a plurality of scan driving units 140 are formed in a non-display area NA located at the outer periphery of a display area AA of the panel 160. The scan driving unit 140 is formed in the panel 160 in the form of a gate-in panel along with a transistor process for sub-pixels. The data driving unit 150 is implemented in the form of a plurality (for example, four) of integrated circuits (ICs) and installed on a plurality (for example, four) of flexible printed circuit boards 155; one end of the data driving unit 150 is attached to a pad unit of the panel 160 by employing the FOG method and the other end is attached to a plurality (for example, two) of source circuit boards 157.

The timing controller 130, the current detection unit 170, and the power controller 180 are formed on the control circuit board 134. The source circuit board 157 and the control circuit board 134 are connected to each other by a flexible printed circuit board 137.

In case an organic light emitting display device is implemented as described above, a first voltage output from the power supply 125 is provided through all the first power line wiring CDD covering from the control circuit board 134 to the panel 160.

In this case, since the first power line wiring VDD is connected together with each other from the control circuit board 134 to the panel 160, it suffices to connect one current detection unit 170 to an arbitrary point of the first power line wiring VDD. As described earlier, this structure generates a shutdown signal SDS in the event of overcurrent and turns off the power supply 125 formed in the system board.

Figure 11:
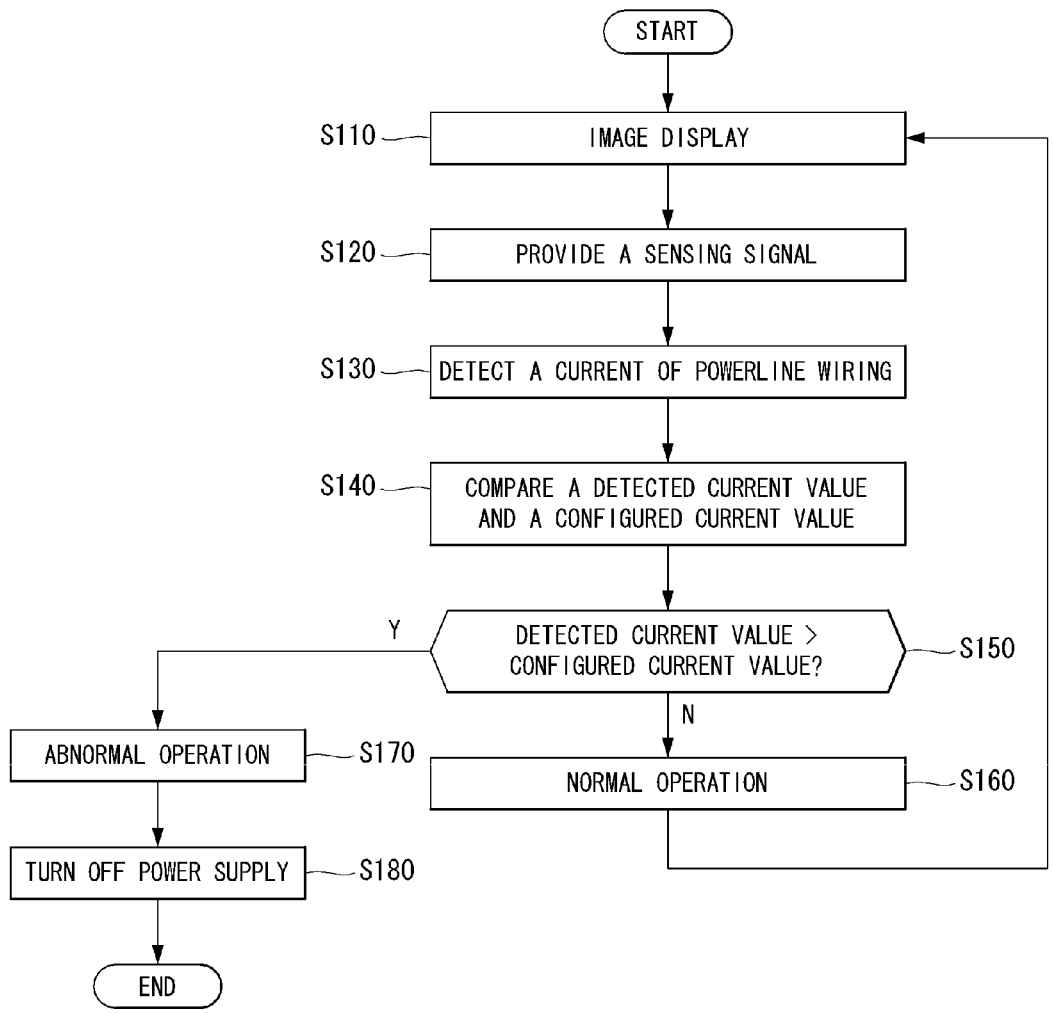
FIG. 11 is a flow diagram illustrating a method for operating an organic light emitting display device according to a first embodiment of the present invention.

In what follows, a method for operating an organic light emitting display device according to the first embodiment of the present invention will be described with reference to FIGS. 1 to 10; however, the operation method of FIG. 11 only represents methods utilizing one or more configurations described earlier but is not limited to the description.

First, the panel 160 displays an image S110. Next, a sensing signal SS is provided to the power controller 180, S120. Then a current is detected by using the current detection unit 170 connected to the first power line wiring VDD, S130. Next, a detected current value is compared with a current value predetermined internally for the power controller 180, S140. Next, it is determined whether the detected current value is larger than the predetermined current value S150; if the detected current value is smaller than the predetermined current value N, it is determined to be operating in a normal manner S160. On the other hand, if the detected current value exceeds the predetermined current value Y, it is determined to be operating in an abnormal manner S170. And a shutdown signal SDS for turning off the power supply 125 is output S180. The above process is repeated continuously or carried out at a predetermined time period.

<Second embodiment>

Figure 12:
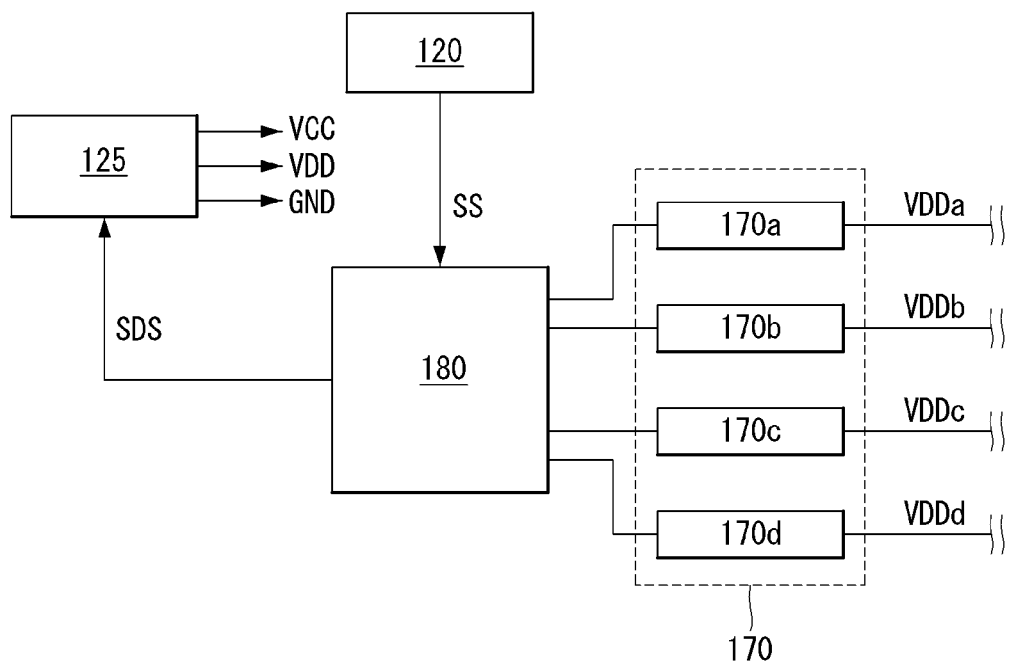
FIG. 12 is a block diagram of a power supply controller according to a second embodiment.

As shown in FIGS. 1 and 12, a circuit controlling the power supply 125 comprises a timing controller 130, a current detection unit 170, and a power controller 180. A control block according to a second embodiment is applied to the case where the panel 160 uses first power line wiring VDD wired up for individual blocks.

The current detection unit 170 detects a current flowing through a first power line wiring VDD wired up for individual blocks and provides the power controller 180 with the detected current values for the individual blocks. To this purpose, M (where M is an integer two or more) current detection units 170 are incorporated. For example, in case the first power line wiring VDD is divided into four blocks, the current detection unit 170 comprises a first current detection unit 170a detecting a current of a power line wiring 1a VDDa to a fourth current detection unit 170d detecting a current of a power line wiring 1d VDDd.

The current detection unit 170 detects a current flowing through the first power line wiring VDD periodically or aperiodically. If the current detection unit 170 detects a current flowing through the first power line wiring VDD regularly and it is controlled by a particular device, it can be implemented by using OP amps. On the other hand, if the current detection unit 170 detects a current flowing aperiodically through the first power line wiring VDD while being controlled by a particular device, it can be implemented by using conventional OP amps and switches. In this case, a switch detects a current in accordance with a control signal.

The timing controller 130 provides a sensing signal SS to the power controller 180. The timing controller 130 can not only provide a panel with sensing data through a data driving unit periodically but also provide the power controller 180 with the sensing signal SS in order for the power controller 180 to operate in synchronization with a timing at which the sensing data is displayed. On the other hand, the timing controller 130 can provide the sensing signal SS to the power controller 180 in order for the power controller 180 to operate for blank intervals excluding an image display interval of the panel.

The power controller 180 receives detected current values of individual blocks from the current detection unit 170 and compares the detected current values of the individual blocks with each other. A shutdown signal SDS is generated and turns off the power supply 125 if a current higher or lower than the currents of the other blocks is detected.

Meanwhile, if a physical distance between the power supply 125 and the power controller 180 is rather long (in other words, in case a transmission path is long or a transmission method is different), the strength of the shutdown signal SDS output from the power controller 180 may be weakened. Similarly, due to a difference between the circuit of the power controller 180 and the circuit of the power supply 125, logic level of the shutdown signal SDS may be changed. To compensate for this change, the power controller 180 may be implemented as shown in FIG. 4 or 5.

In the second embodiment, a criterion based on which an overcurrent has occurred employs a method of comparing detected current values of individual blocks with each other.

Figure 13:
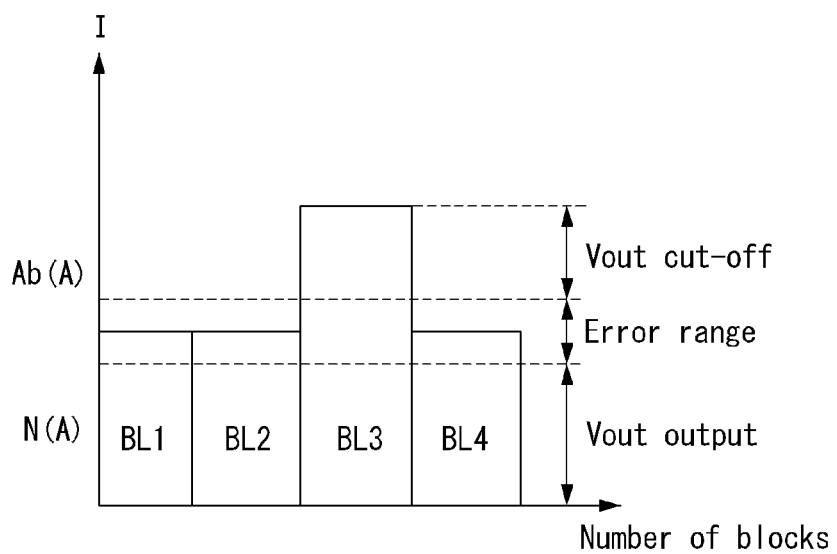
FIG. 13 illustrates output states of a power supply according to a comparison result between detected currents of individual blocks.

As shown in FIG. 13, if a current value of a third block among detected current values of blocks (BL1~BL4) corresponds to "Ab(A)" which is larger than the current values "N(A)" of the 1, 2, and 4 block (BL1, BL2, and BL4), it indicates an abnormal state where an overcurrent is detected and the power controller 180 outputs a shutdown signal SDS. Since the power supply 125 is turned off in response to the shutdown signal SDS, an output voltage of the output port Vout of the power supply is cut off. On the other hand, if detected current values of individual blocks are similar to or the same as each other, it indicates a normal state where an overcurrent is not detected and the power supply 125 outputs an output voltage through the output port Vout.

Meanwhile, the amount of current consumption for each block of the first power line wiring may differ from each other according to the image displayed on the panel 160. Therefore, in this situation, it may be advantageous to set up a permissible error range. Therefore, the power controller 180 may be designed in such a way that if detected current values of individual blocks fall within the error range, the shutdown signal SDS is not generated whereas a detected current value of a block gets out of the error range, the shutdown signal SDS is generated.

Figure 14:
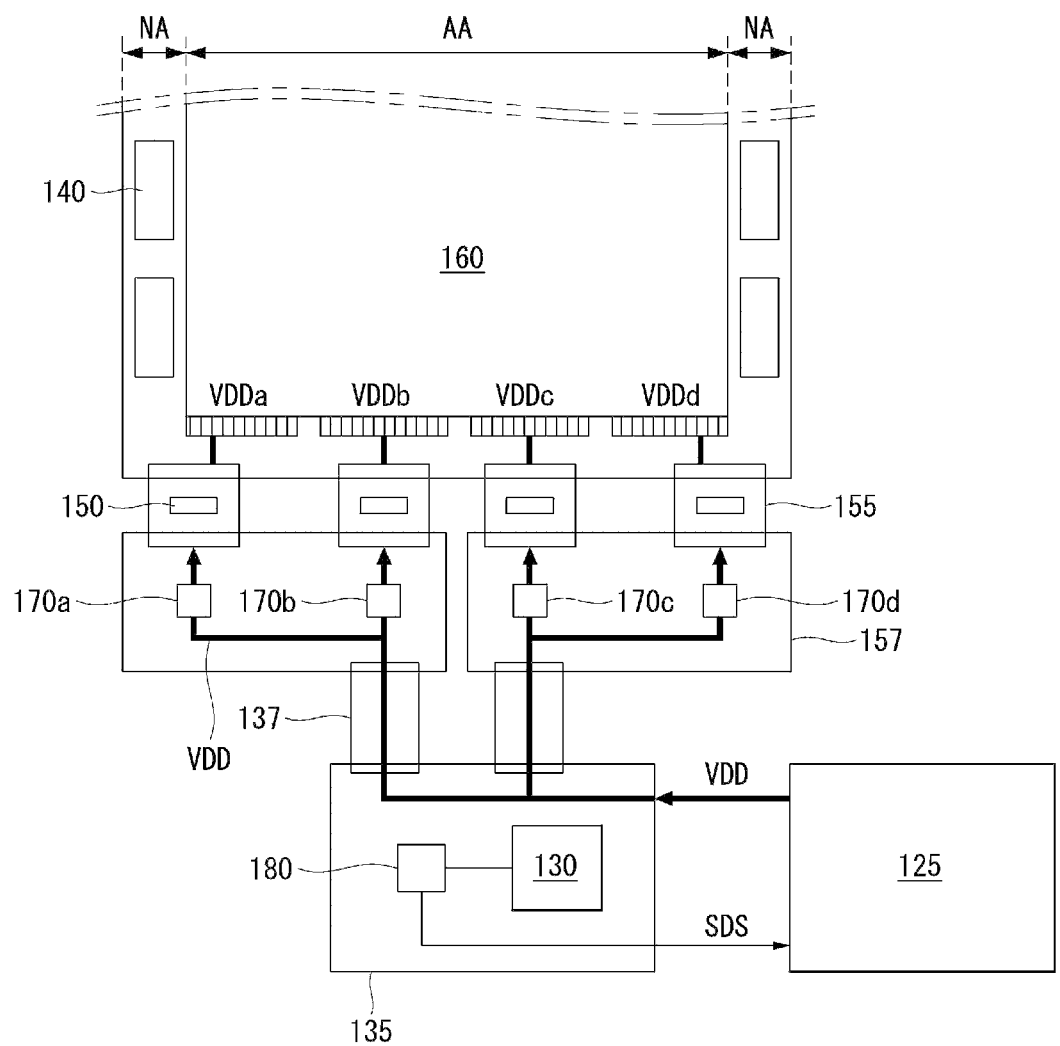
FIG. 14 illustrates an organic light emitting display device implemented according to a second embodiment of the present invention.

As shown in FIG. 14, a first power line wiring VDD is disposed in such a way that wiring is distinguished for each individual block of the panel 160. For example, the first power line wiring is disposed to form four blocks of 1a to 1b power line wiring VDDa VDDd for each individual region of the panel 160.

A plurality of scan driving units 140 are formed in a non-display area NA located at the outer periphery of a display area AA of the panel 160. The scan driving unit 140 is formed in the panel 160 in the form of a gate-in panel along with a transistor process for sub-pixels. The data driving unit 150 is implemented in the form of a plurality (for example, four) of integrated circuits (ICs) and installed on a plurality (for example, four) of flexible printed circuit boards 155; one end of the data driving unit 150 is attached to a pad unit of the panel 160 by employing the FOG method and the other end is attached to a plurality (for example, two) of source circuit boards 157.

The timing controller 130, the current detection unit 170, and the power controller 180 are formed on the control circuit board 134. The source circuit board 157 and the control circuit board 134 are connected to each other by a flexible printed circuit board 137.

In case an organic light emitting display device is implemented as described above, a first voltage output from the power supply 125 is first provided through the first power line wiring VDD and then provided through four branches of power line wiring 1a to 1d (VDDa VDDd) after the source circuit board 157.

In this case, since the power line wiring branches into four sub-divisions, it suffices to connect the first to the fourth current detection unit 170a-170d for each branch point. As described earlier, this structure outputs a shutdown signal SDS in the event of overcurrent and turns off the power supply 125 formed in the system board.

Figure 15:
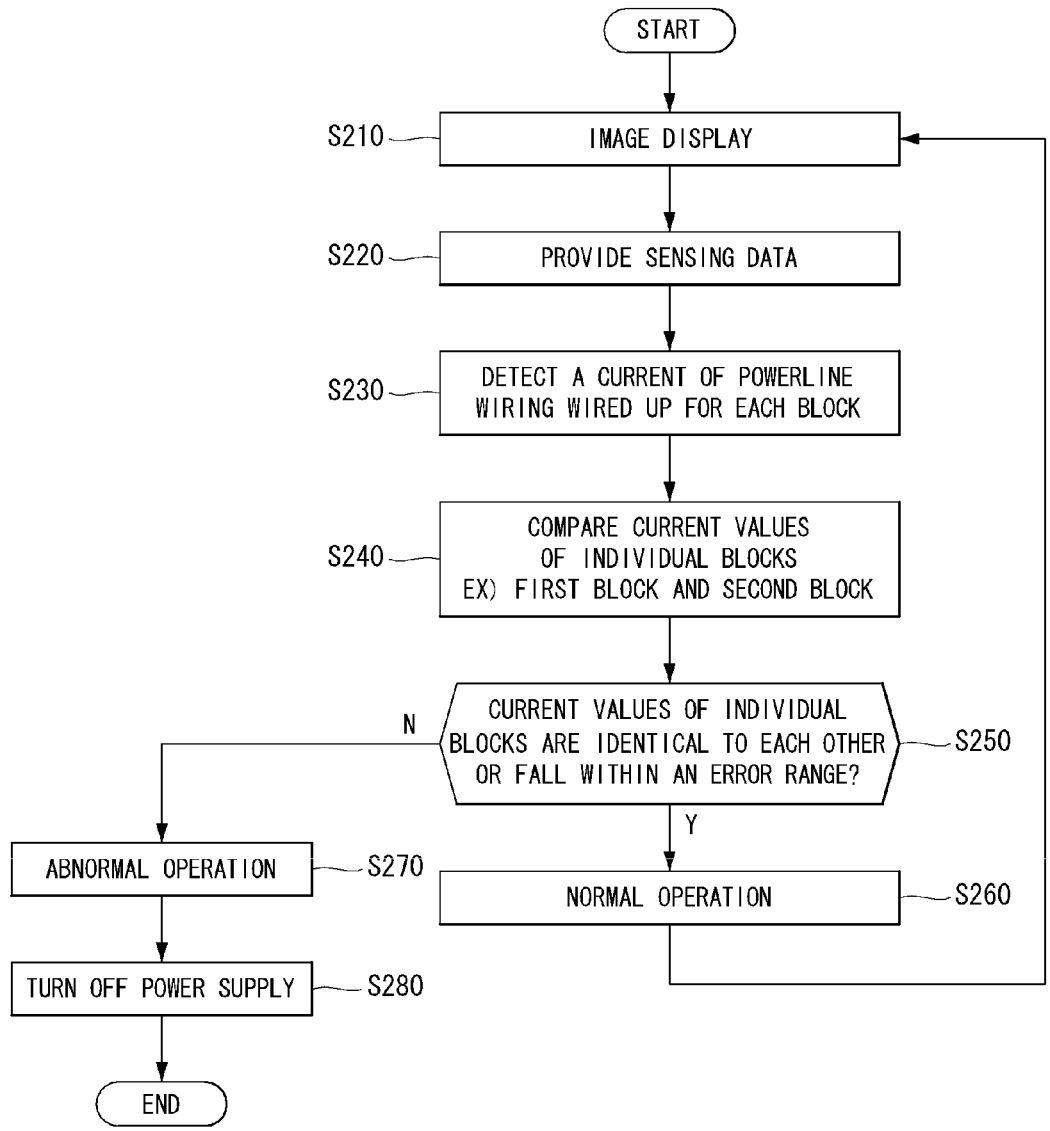
FIG. 15 is a flow diagram illustrating a method for operating an organic light emitting display device according to a second embodiment of the present invention.
Figure 16:
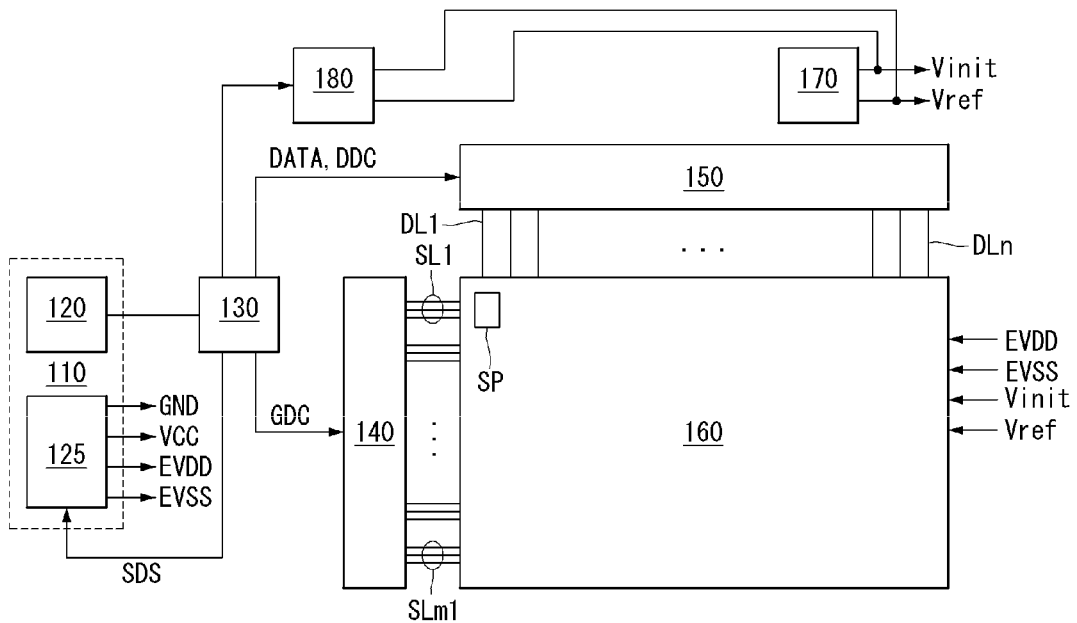
FIG. 16 is a block diagram of an organic light emitting display device according to a third embodiment of the present invention.
Figure 17:
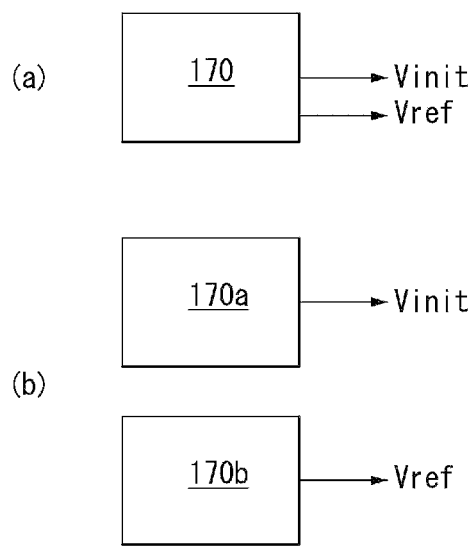
FIG. 17 is a first example of a compensation voltage supply.
Figure 18:
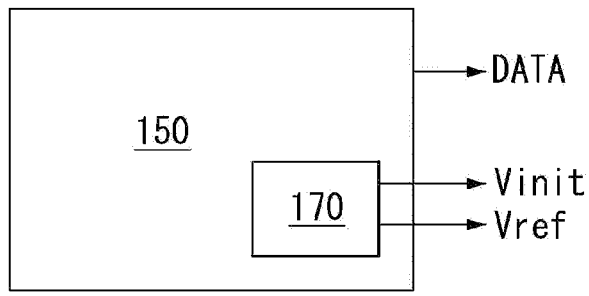
FIG. 18 is a second example of a compensation voltage supply.
Figure 19:
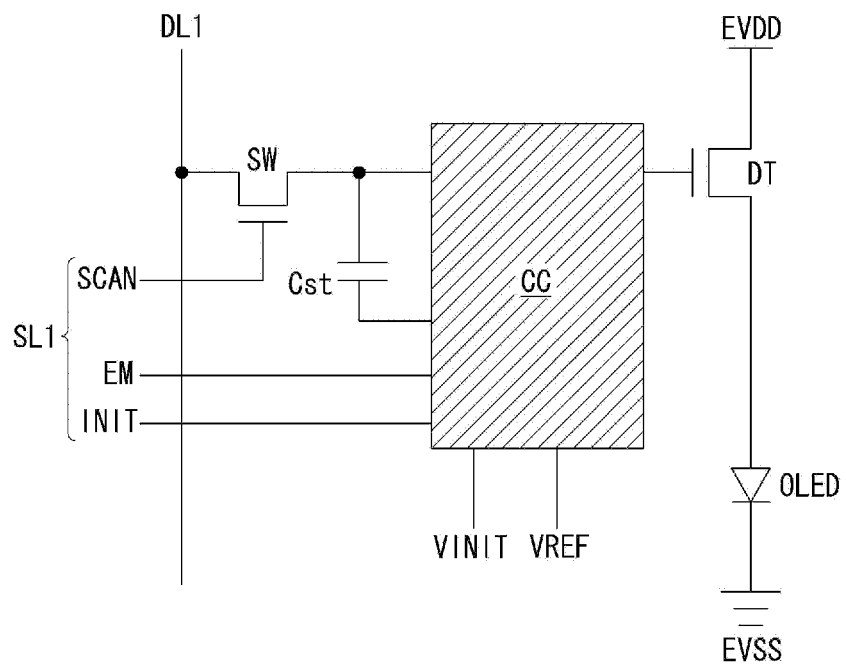
FIG. 19 is a circuit diagram of a sub-pixel.
Figure 20:
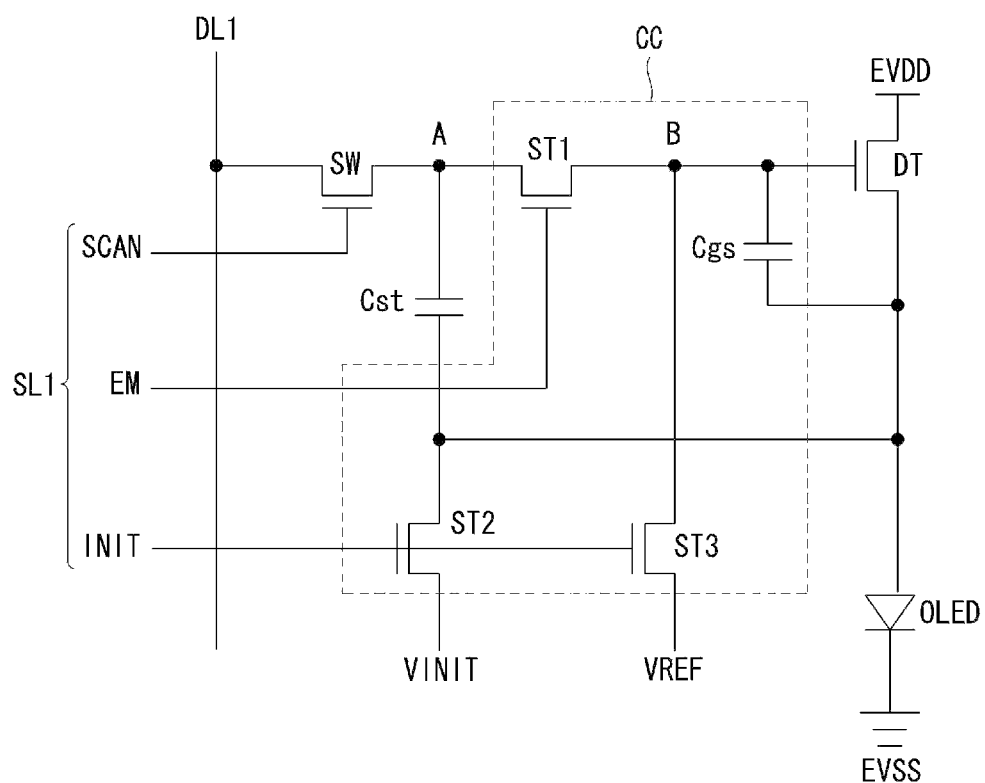
FIG. 20 is an example of a compensation circuit of FIG. 19.

In what follows, a method for operating an organic light emitting display device according to the second embodiment of the present invention will be described with reference to FIGS. 1, 12, and 15; however, the operation method of FIG. 15 only represents methods utilizing one or more configurations described earlier but is not limited to the description.

First, the panel 160 displays an image S210. Next, sensing data (for example, black data) is provided to the panel 160, S220. Next, currents are detected by using the first to the fourth current detection unit 170a-170d connected to the power line wiring for individual groups 1a to 1d (VDDa~VDDd) S230. Then, detected current values of individual blocks from the first to the fourth current detection unit 170a-170d are compared with each other S240. Next, it is determined whether the detected current values of individual blocks are identical to (or similar to) or within a permissible error range S250. If the detected current values of individual blocks are identical (or similar) to or within a permissible error range Y, it is determined to be operating in a normal manner S260. On the other hand, if a detected current value is higher or lower than the other current values N, it is determined to be operating in an abnormal manner S270. And a shutdown signal SDS for turning off the power supply 125 is output S280. The above process is repeated continuously or carried out at a predetermined time period.

Meanwhile, the present invention assumes that a current flowing through a first power line wiring is detected to solve a short circuit problem between power terminals. However, in the event of short circuit between the first power line wiring and the ground wiring, currents are made to flow between the first power line and the ground wiring; therefore, it may be still acceptable to have current detection units at the ground wiring rather than the first power line wiring. Also, since various voltages (in addition to VCC, VDD shown in FIG. 1) are employed in case of an organic light emitting display device, power line wiring is not limited only to the first power line wiring described above.

Moreover, the power controller described in FIGS. 3, 4, 5, 9, 10, and 14 of the present invention can be incorporated into the timing controller. In this case, the current detection unit further incorporates an analog-to-digital converter which converts a detected analog current value to a digital current value. Accordingly, the power controller included in the timing controller according to the first embodiment can determine based on the digital current value obtained from the analog-to-digital converter whether a detected current value gets out of a range set internally. Meanwhile, the power controller included in the timing controller according to the second embodiment can determine based on the digital current value obtained from the analog-to-digital converter whether a detected current value from a particular block is higher or lower than the current values of the other blocks.

As described above, the present invention can provide an organic light emitting display device and a method for operating the device, capable of preventing a local burning out from being spread to the whole system (burning out the sub-pixel and its adjacent sub-pixels) as excessive currents flow into the elements included in sub-pixels due to the occurrence of short circuit between power terminals and thus removing a possibility of being led to a fire. Also, the present invention can provide an organic light emitting display device and a method for operating the device, capable of controlling the power supply by using a short-circuit detection circuit which can be modified into various forms and cope with various cases according to configurations of the device.

<Third embodiment>

Figure 31:
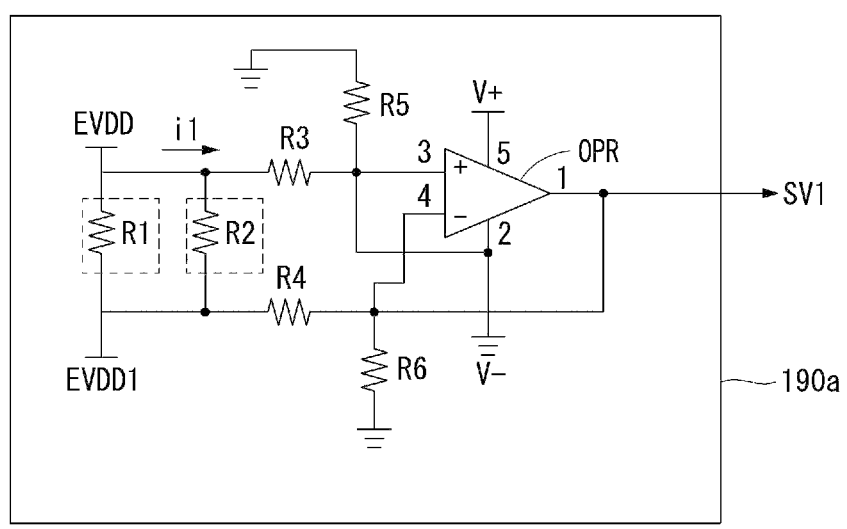
FIG. 31 is a circuit diagram of a current sensing unit of a first block of FIG. 30.

As shown in FIG. 31, an organic light emitting display device according to a third embodiment of the present invention comprises an image processing unit 120, a power supply 125, a timing controller 130, a data driving unit 150, a scan driving unit 140, a panel 160, a compensation voltage supply 170, and a voltage sensing unit 180.

An image processing unit 120 provides a timing controller 130 with a vertical synchronization signal (Vsync), a horizontal synchronization signal (Hsync), a data enable signal (DE), a clock signal (CLK), and a data signal (DATA). The image processing unit 120 is formed in a system board 110.

The timing controller 130 controls an operation timing of the data driving unit 150 and the scan driving unit 140 by using timing signals such as the vertical synchronization signal (Vsync), the horizontal synchronization signal (Hsync), the data enable signal (DE), and the clock signal (CLK). Since the timing controller 130 is capable of determining a frame interval by counting the data enable signal (DE) during one horizontal interval, the vertical synchronization signal (Vsync) and the horizontal synchronization signal (Hsync) provided from the outside can be omitted. Control signals generated at the timing controller 130 include a gate timing control signal (GDC) for controlling the operational timing of the scan driving unit 140 and a data timing control signal (DDC) for controlling the operational timing of the data driving unit 150. The gate timing control signal (GDC) includes a gate start pulse, a gate shift clock, and a gate output enable signal. The data timing control signal (DDC) includes a source start pulse, a source sampling clock, and a source output enable signal.

The scan driving unit 140 shifts the level of a gate driving voltage in response to the gate timing control signal (GDC) provided from the timing controller 130 and generates a scan signal in a sequential manner. The scan driving unit 140 provides a scan signal through scan lines (SL1~SLm) connected to sub-pixels (SPs) included in the panel 160.

The data driving unit 150 performs sampling of the data signal (DATA) provided from the timing controller 130 in response to the data timing control signal (DDC) provided from the timing controller 130 and latches on the sampled data signal and transforms the latched, sampled data signal into the data of a parallel data system. The data driving unit 150 transforms the data signal (DATA) into a gamma reference voltage. The data driving unit 150 provides the data signal (DATA) through the data lines (DL1~DLn) connected to sub-pixels (SPs) included in the panel 160.

The power supply 125 converts an external voltage supplied from the outside into a first voltage (for example, 20 V level), a second voltage (for example, 3.3V level), and a low voltage (for example, 0 V level), and so on. The first voltage, being supplied to a first power line wiring EVDD, is a drain level voltage; the second voltage, being supplied to a second power line wiring VCC, is a collector level voltage; and the low level voltage is supplied to the ground EVSS, GND and is a base level voltage. The power supply 125 is formed in the system board 110 together with the image processing unit 120. The output voltage of the power supply 125 is used for the image processing unit 120, the timing controller 130, the data driving unit 150, the scan driving unit 140, the panel 160, and the compensation voltage supply 170.

Figure 32:
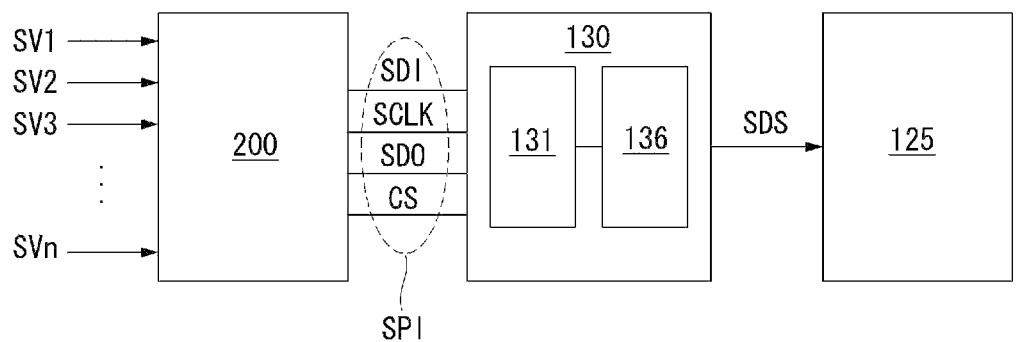
FIG. 32 is a block diagram of an analog-to-digital converter, a timing controller, and a power supply.
Figure 33:
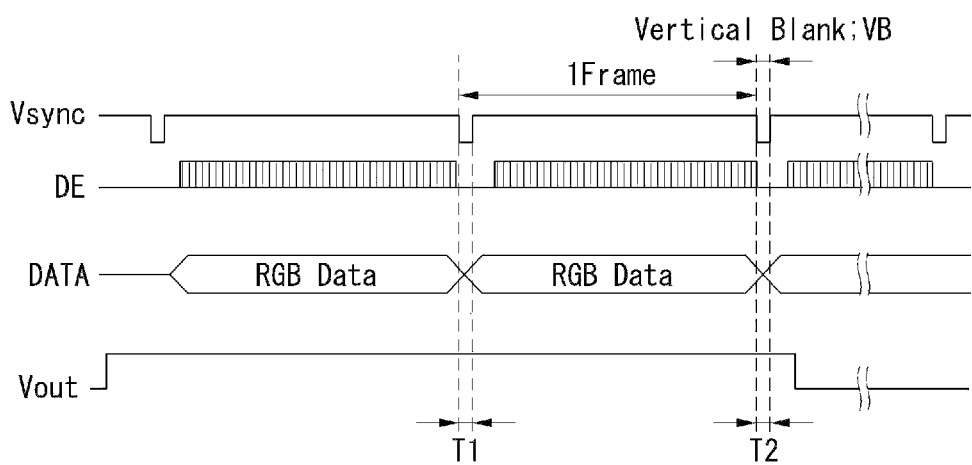
FIG. 33 is a waveform diagram illustrating operation of an analog-to-digital converter in response to a blank interval.

The compensation voltage supply 170 outputs a compensation voltage Vinit, Vref. The compensation voltage Vinit, Vref includes an initialization voltage Vinit and a reference voltage Vref. The initialization voltage Vinit and the reference voltage Vref may be identical to each other or may have different levels from each other. The initialization voltage Vinit and the reference voltage Vref output from the compensation voltage supply 170 are provided to compensation circuits included in sub-pixels (SPs) of the panel 160. As shown in FIG. 32($a$), the compensation voltage supply 170 can output the initialization voltage Vinit and the reference voltage Vref by using a voltage output from the power supply 125. As shown in FIG. 32($b$), the compensation voltage supply 170 can be divided into a first compensation voltage supply 170$a$ generating the initialization voltage Vinit and a second compensation voltage supply 170$b$ generating the reference voltage Vref by using a voltage output from the power supply 125. Different from the above, as shown in FIG. 33, the compensation voltage supply 170 can generate the initialization voltage Vinit and the reference voltage Vref by using a voltage output from the inside of the data driving unit 150.

The voltage sensing unit 180 senses a compensation voltage Vinit, Vref output from the compensation voltage supply 170 and outputs the sensed voltage. The voltage sensing unit 180 separately senses the initialization voltage Vinit and the reference voltage Vref output from the compensation voltage supply 170. The compensation voltage Vinit, Vref sensed by the voltage sensing unit 180 is used as a criterion based on which the timing controller 130 generates a shutdown signal SDS for turning off the power supply 125.

The panel 160 comprises sub-pixels disposed in the form of a matrix. Sub-pixels consist of red, green, and blue sub-pixels; in some cases, white sub-pixels are included. A panel 160 incorporating white sub-pixels can emit white light even if light emitting layers of individual sub-pixels do not emit red, green, and blue light. In this case, the white light is converted into red, green, and blue light by an RGB color filter.

Meanwhile, sub-pixels included in the panel 160 may be comprised as follows.

Figure 34:
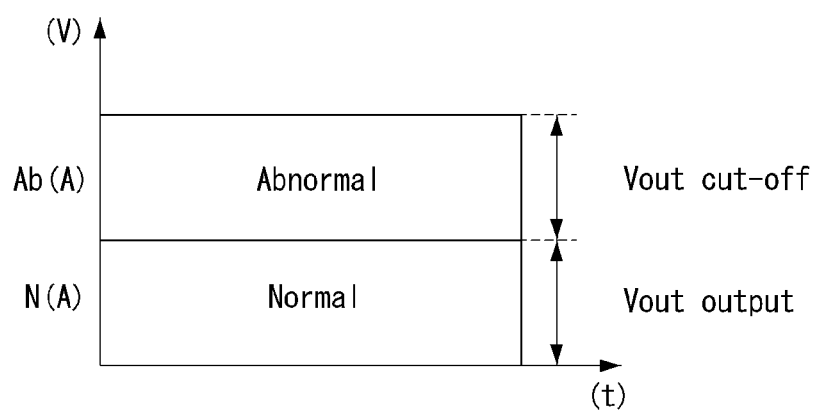
FIGS. 34 and 35 illustrate output states of a power supply according to a decision of a timing controller.

As shown in FIG. 34, one sub-pixel comprises a switching transistor SW, a driving transistor DR, a capacitor Cst, a compensation circuit CC, and an organic light emitting diode D. In case a compensation circuit CC is included, one scan line SL1 comprises a first scan line EM, a second scan line INIT, and a third scan line SCAN.

The compensation circuit CC compensates for a threshold voltage of a driving transistor and the like by using the initialization voltage Vinit and the reference voltage Vref. A sub-pixel incorporating the compensation circuit CC detects a threshold voltage of the driving transistor DT by using a diode connection method, a source-following method, and so on. Since there are a large volume of reference documents for the diode connection method, further description thereof will not be given in this document; instead, the source-following method will be described as follows.

The source-following method inserts a compensation capacitor between the gate-source electrode of the driving transistor DT and in the event of detecting a threshold voltage, makes the source voltage of the driving transistor DT follow the gate voltage. Moreover, since the drain voltage of the driving transistor DT is separated from the gate electrode and receives a power voltage from a first power line wiring EVDD, the source-following method is enabled to detect a negative-valued threshold voltage as well as a positive-valued threshold voltage.

Moreover, the source-following method makes the gate electrode of the driving transistor float in the event of sensing a threshold voltage of the driving transistor DT and improves compensation capability of a threshold voltage by using a compensation capacitor installed between the gate-source electrode of the driving transistor DT and a parasitic capacitor of the driving transistor DT.

The compensation circuit CC comprises one or more transistors and capacitors; in the following, circuit configuration of a sub-pixel in FIG. 34 will be described more specifically by using one example of compensation circuit for which the source-following method has been applied described above.

Figure 35:
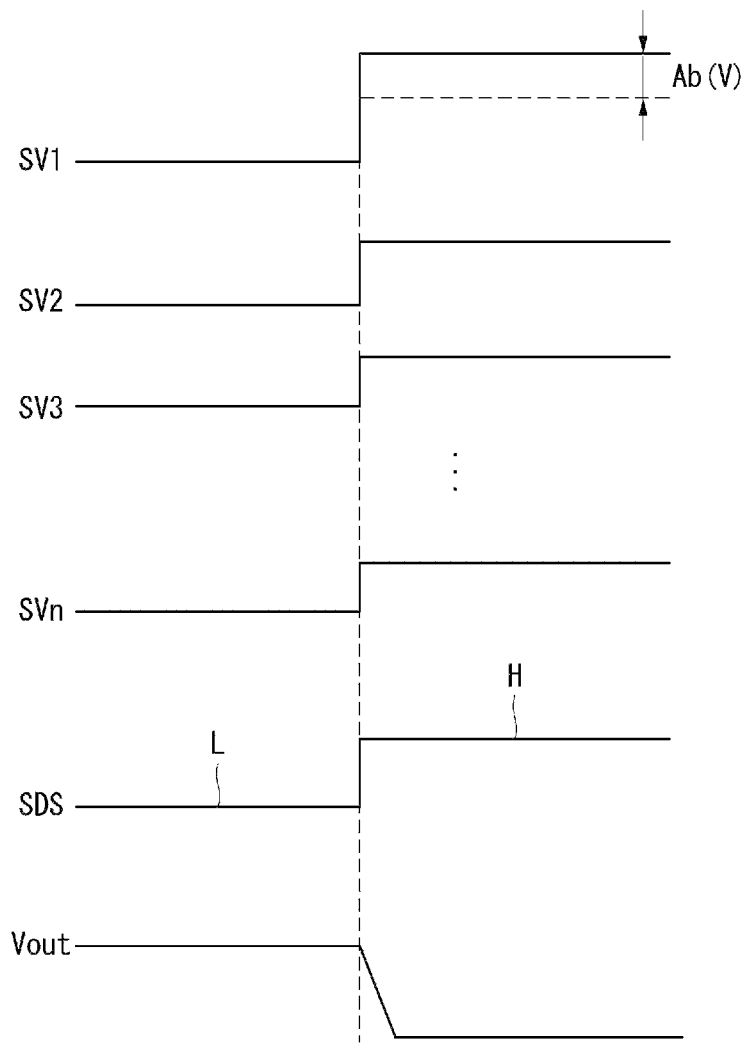

As shown in FIG. 35, the compensation circuit CC comprises a first transistor ST1, a second transistor ST2, a third transistor ST3, and a compensation capacitor Cgs. In what follows, the compensation circuit CC is introduced for the convenience of description only; the third embodiment of the present invention is not limited to the descriptions below but can be used for all the structure for compensating for a threshold voltage of the driving transistor DT by using the reference voltage Vref.

A first transistor ST1 provides a data voltage stored in a node A to a node B in response to a light emission control signal (em) provided through a first scan line EM. The gate electrode of the first transistor ST1 is connected to the first scan line EM; a first electrode is connected to the node A while a second electrode is connected to the node B. The first transistor ST1 is a node voltage switching transistor.

A second transistor ST2 provides an initialization voltage Vinit to a node C in response to an initialization signal (init) provided through a second scan line INIT. The gate electrode of the second transistor ST2 is connected to the second scan line INIT; a first electrode is connected to the node C while a second electrode is connected to an initialization voltage terminal VINIT. The second transistor ST2 is an initialization voltage supply transistor.

A third transistor ST3 provides a reference voltage Vref to a node B in response to an initialization signal (init) provided through a second scan line INIT. The gate electrode of the third transistor ST3 is connected to the second scan line INIT; a first electrode is connected to the node B while a second electrode is connected to a reference voltage terminal VREF. The third transistor ST3 is a reference voltage supply transistor.

The compensation capacitor Cgs renders the source-following method applicable in the event of detecting a threshold voltage of the driving transistor DT and contributes to improving the capability of compensating for the threshold voltage. The gate electrode of the driving transistor DT is connected to one end of the compensation capacity Cgs and the node C is connected to the other end thereof.

As the compensation circuit CC is configured as described above, the switching transistor SW provides a data voltage Vdata to the node A in response to a switching signal (scan) provided through the third scan line SCAN. The gate electrode of the switching transistor SW is connected to the third scan line SCAN; the first electrode is connected to the node A while the second voltage is connected to a first data line DLL. One end of a storage capacitor Cst is connected to the node A while the other end of the storage capacitor Cst is connected to the node C. The gate electrode of the driving transistor DT is connected to the node B; the first electode is connected to the node C while the second voltage is connected to a first power line wiring EVDD. The anode of an organic light emitting diode (OLED) is connected to the node C while the cathode of the OLED is connected to the ground wiring EVSS. In the description above, it was assumed that the source electrode of transistors is selected as the first electrode, while the drain electrode thereof as the second electrode; however, the present invention is not limited to the assumption above.

Figure 21:
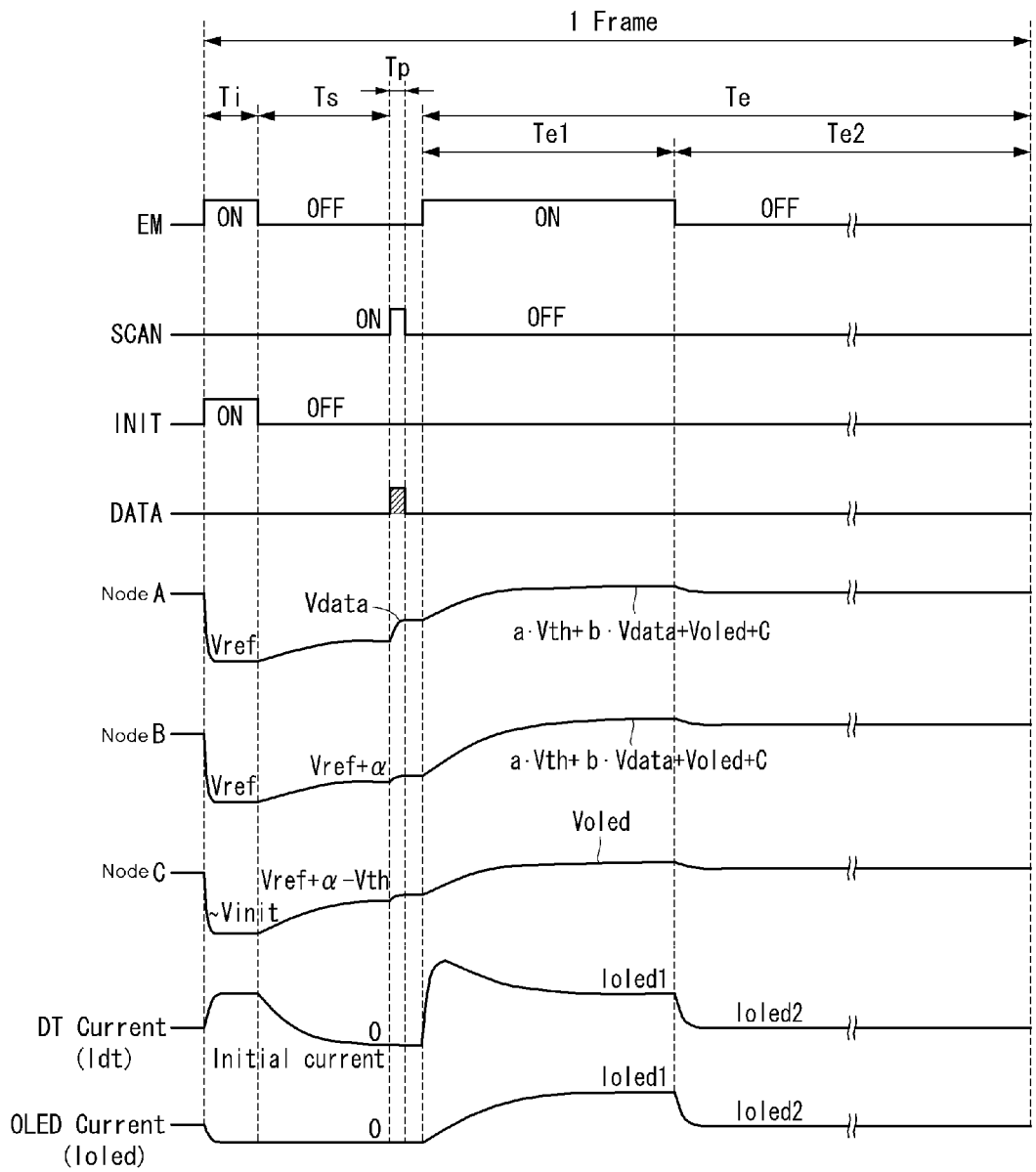
FIG. 21 is a driving waveform diagram of a sub-pixel of FIG. 20.

As shown in FIG. 21, an image display interval of a sub-pixel incorporating a compensation circuit CC is divided into an initialization interval Ti during which the node A, B, and C are initialized into a particular voltage, a sensing interval Ts during which a threshold voltage of the driving transistor DT is detected and stored, a programming interval Tp during which a data voltage Vdata is applied, and a light emission interval Te during which a driving current applied to an organic light emitting diode (OLED) is compensated independently of a threshold voltage by using the threshold voltage and the data voltage Vdata. Here, the light emission interval Te is further divided into a first Te1 and a second light emission interval Te2. More detailed description related to the compensation circuit CC refers to Korean patent application no. 10-2012-0095604.

Sub-pixels incorporating a compensation circuit CC as described above employs a compensation voltage Vinit, Vref for compensating for a threshold voltage of the driving transistor DT as well as a conventional type of power source such as a first power line wiring EVDD and ground wiring EVSS.

Since organic light emitting display panels require a large amount of currents compared with the liquid crystal display panels, in case of short circuit at power terminals, an excessive amount of currents flows into the elements of the respective sub-pixels. Various factors cause short circuit at power terminals, which include not only internal, structural factors such as particles introduced into the organic light emitting display panel during manufacturing process (or module process), cracks, misalignment of pad units, and narrow wiring layout; but also external factors such as static electricity.

If short circuit occurs at power terminals, a change occurs subsequently in the compensation voltage Vinit, Vref. According to a third embodiment of the present invention, the compensation voltage Vinit, Vref influenced by short circuit at power sources is sensed and occurrence of short circuit is checked and accordingly, power source of the power supply is cut off, which will be described in more detail below.

Figure 22:
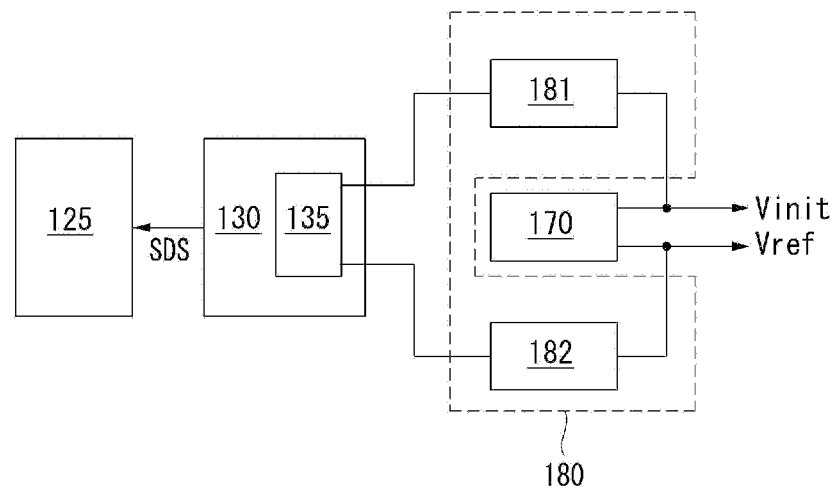
FIG. 22 is a block diagram implementing a circuit according to a third embodiment of the present invention.

As shown in FIG. 22, the compensation voltage supply 170 generates a compensation voltage Vinit, Vref including the initialization voltage Vinit and the reference voltage Vref. The compensation voltage supply 170 is realized by one of the examples shown in FIGS. 32 and 33.

The voltage sensing unit 180 comprises a first voltage sensing unit 181 sensing the initialization voltage Vinit and a second voltage sensing unit 182 sensing the reference voltage Vref. The first and the second voltage sensing unit 181, 182 compares the sensed compensated voltage Vinit, Vref with an internally set threshold voltage and outputs the comparison result.

The timing controller 130 includes a short-circuit detection unit 135. The short-circuit detection unit 135 generates a shutdown signal SDS for turning off the power supply 125 based on the results obtained from the first 181 and the second voltage sensing unit 182.

The first 181 and the second voltage sensing unit 182 differ in the voltages provided to a first and a second threshold voltage terminal but have structures which are the same as or similar to each other. Therefore, in what follows, descriptions of the present invention will be given with reference to the second voltage sensing unit 182 as a representative example.

Figure 23:
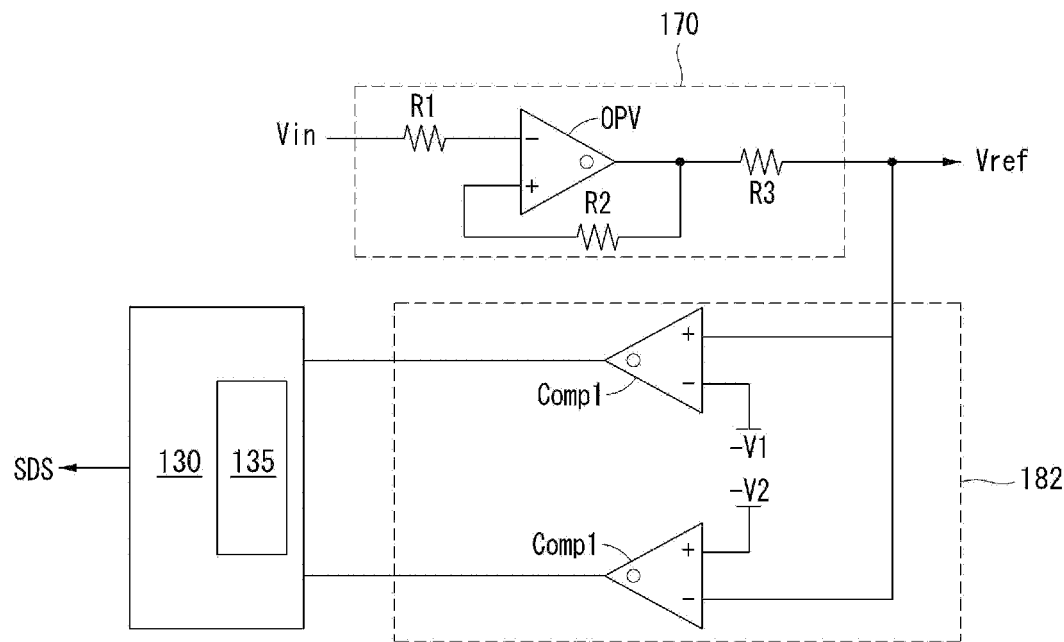
FIG. 23 is a circuit diagram of a compensation voltage supply and a voltage sensing unit of FIG. 22.

As shown in FIG. 23, the compensation voltage supply 170 amplifies an external voltage source Vin and outputs a reference voltage Vref. It is assumed that the compensation voltage supply 170 comprises an amplifier OPV and resistors R1, R2, R3. A first resistor R1 has it one end connected to the external voltage source Vin and the other end of the first resistor R1 is connected to a first terminal (−) of the amplifier OPV. One end of a second resistor R2 is connected to a second terminal (+) of the amplifier while the other end of the second resistor R2 is connected to a third terminal (O) of the amplifier OPV. One end of a third resistor R3 is connected to a third terminal of the amplifier OPV while the other end of the third resistor R3 is connected to an output terminal of the amplifier OPV.

The second voltage sensing unit 182 senses the reference voltage Vref. The second voltage sensing unit 182 comprises a first comparator Comp1 sensing the minimum level of the reference voltage Vref and a second comparator Comp2 sensing the maximum level of the reference voltage Vref. A first terminal (−) of the first comparator is connected to a first threshold voltage terminal (−V1) and a second terminal (+) of the first comparator is connected to an output terminal of the compensation voltage supply 170 and an output terminal (O) of the first comparator is connected to the short-circuit detection unit 135. A first terminal (−) of the second comparator is connected to an output terminal of the compensation voltage supply 170 and a second terminal (+) of the second comparator is connected to the second threshold voltage terminal (−V2) and an output terminal of the second comparator is connected to the short-circuit detection unit. A negative voltage is employed for the voltage provided to the first (−V1) and the second threshold voltage terminal (−V2).

The first Comp1 and the second comparator Comp2 compare a sensed reference voltage with the first and the second threshold voltage internally set; and determine whether the minimum and the maximum level of the reference voltage gets out of a permissible range specified; and output the result.

As shown in FIG. 10, a plurality of scan driving units 140 are formed in a non-display area NA located at the outer periphery of a display area AA of the panel 160. The scan driving unit 140 is formed in the panel 160 in the form of a gate-in panel along with a transistor process for sub-pixels. The data driving unit 150 is implemented in the form of a plurality (for example, four) of integrated circuits (ICs) and installed on a plurality (for example, four) of first flexible printed circuit boards 155; one end of the data driving unit 150 is attached to a pad unit of the panel 160 by employing the FOG method and the other end is attached to a plurality (for example, two) of source circuit boards 157.

The timing controller 130, the compensation voltage supply 170, and the voltage sensing unit 180 are formed on the control circuit board 134. The source circuit board 157 and the control circuit board 134 are connected to each other by a second flexible printed circuit board 137. The image processing unit 120 and the power supply 125 are formed on the system board 110. The control circuit board 134 and the system board 110 are connected to each other by a third flexible printed circuit board 115.

In case an organic light emitting display device is implemented as described above, a compensation voltage generated at the compensation voltage supply 170 is provided through the wiring which passes through the control circuit board 134 and reaches up to the panel 160.

Meanwhile, the description above assumed that the compensation voltage supply 170 and the voltage sensing unit 180 are formed on the control circuit board 134. However, it should be noted that the voltage sensing unit 180 may be formed at various positions including the source circuit board 157.

In the following, output of a shutdown signal and output states of the power supply will be described with one example illustrating a case where a reference voltage gets out of a permissible range along with indication of a minimum and a maximum level of the reference voltage.

Figure 25:
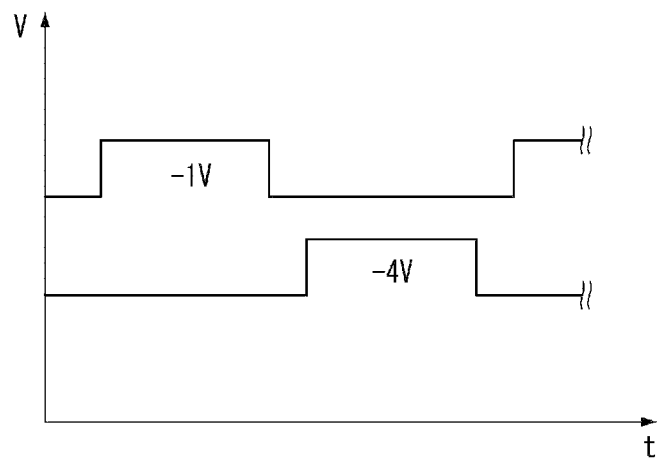
FIG. 25 illustrates a maximum and a minimum level of a reference voltage.

As shown in FIG. 25, the reference voltage Vref is output being fixed at a particular voltage or output being varied within a particular voltage range. In what follows, it is assumed that the reference voltage Vref is output being fixed at a voltage level of −2.2V while a permissible range of the minimum level is set at a voltage level of −1V and a permissible range of the maximum level is set at a voltage level of −4V.

Figure 26:
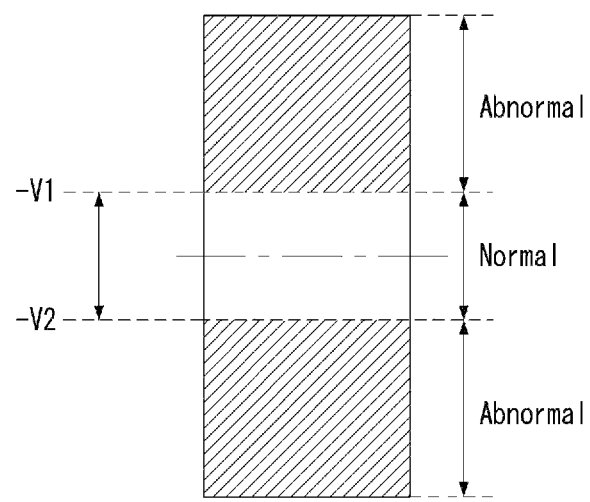
FIG. 26 illustrates an allowable range of a reference voltage.

In this case, the permissible range for the reference voltage Vref as shown in FIG. 26 becomes 43V level. Thus the first threshold voltage of FIG. 23 provided to the first threshold voltage terminal (−V1) becomes −1V while the second threshold voltage of FIG. 23 provided to the second threshold voltage terminal (−V2) becomes −4V.

<The Case where the Minimum and the Maximum Level of a Reference Voltage Ranges Between −1V and −4V>

Figure 27:
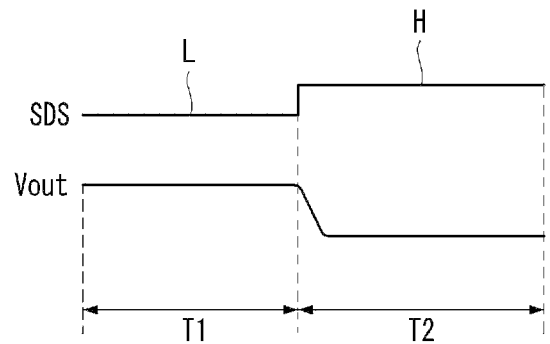
FIG. 27 illustrates output states of a power supply according to a shutdown signal.

The minimum level of reference voltage sensed by a first comparator Comp1 and the maximum level of reference voltage sensed by a second comparator Comp2 ranges between −1V and −4V. In this case, the short-circuit detection unit 135 regards the power source of the panel as normal as shown in FIG. 26 and generates a shutdown signal SDS of logic low (L) as shown for a first interval Ti of FIG. 27 (or it may generate no signal). At this time, the power supply 125 maintains output of the output terminal Vout.

<The Case where the Minimum and the Maximum Level of a Reference Voltage Gets Out of a Range Between −1V and −4V>

The minimum level of reference voltage sensed by a first comparator Comp1 and the maximum level of reference voltage sensed by a second comparator Comp2 get out of a range between −1V and −4V. In this case, the short-circuit detection unit 135 regards the power source of the panel as abnormal as shown in FIG. 26 and generates a shutdown signal SDS of logic high (H) as shown for a second interval T2 of FIG. 27. At this time, the power supply 125 stops providing an output through the output terminal Vout and is turned off.

Meanwhile, the example above assumed that the power supply 125 is turned off only if a shutdown signal SDS of logic high (H) is generated. However, the power supply 125 can be so designed to be turned off if a shutdown signal SDS of logic low (L) is generated.

Figure 28:
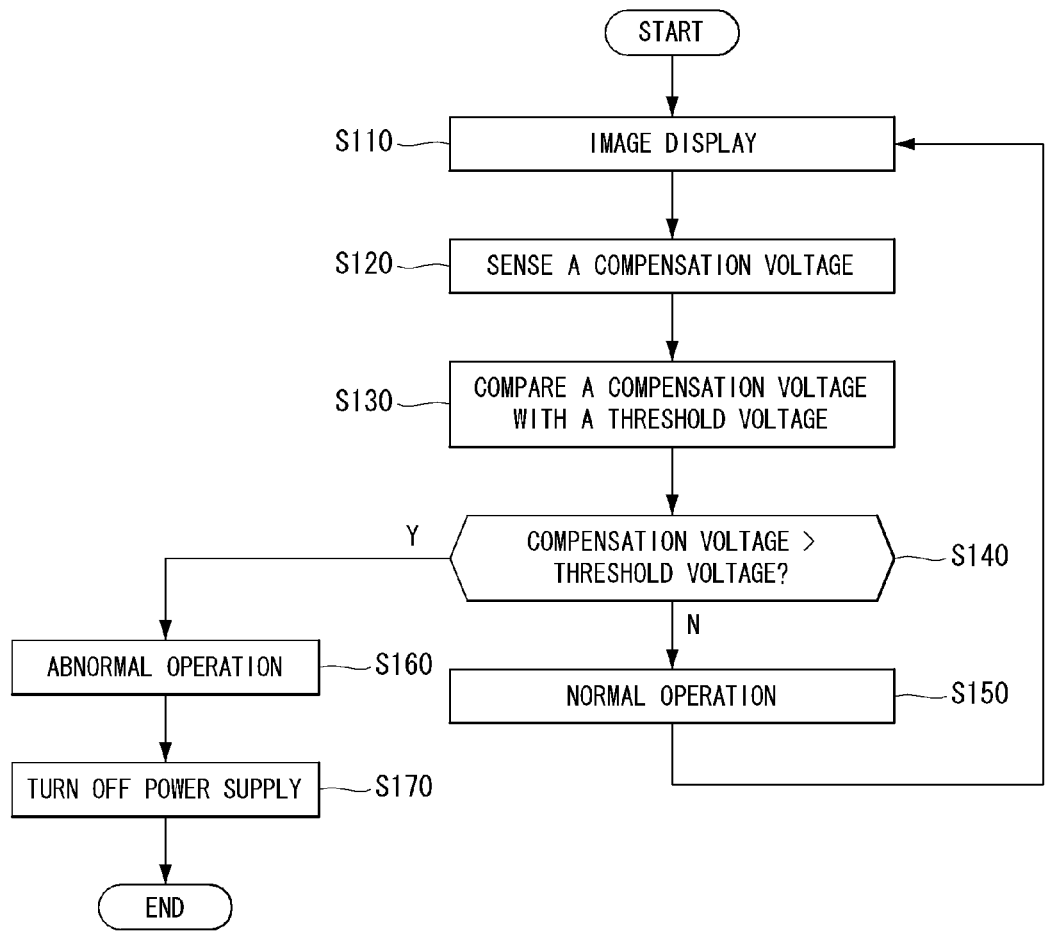
FIG. 28 is a flow diagram illustrating a method for operating an organic light emitting display device according to a third embodiment of the present invention.

In what follows, a method for operating an organic light emitting display device according to the third embodiment of the present invention will be described with reference to FIGS. 1 to 28; however, the operation method of FIG. 28 only represents methods utilizing one or more configurations described earlier but is not limited to the description.

First, the panel 160 displays an image S110. Next, a compensation voltage Vinit, Vref provided to the panel 160 is sensed S120. Then the compensation voltage Vinit, Vref is compared with a threshold voltage −V1, −V2, S130. Next, if the reference voltage Vinit, Vref falls within a permissible range without getting out of the threshold voltage −V1, −V2 (N), it is regarded as normal S150; and does not generate a shutdown signal SDS for turning off the power supply 125 which provides power to the panel 160. Afterwards, the panel 160 continues to display images.

Different from the above, if the compensation voltage Vinit, Vref exceeds the threshold voltage −V1, −V2, escaping the permissible range for the reference voltage, it is regarded as abnormal S160 and generates a shutdown signal SDS for turning off the power supply 125 which provides power to the panel 160, S170. Afterwards, the panel 160 does not display images.

As described above, the third embodiment of the present invention provides an organic light emitting display device and a method for operating the device, capable of controlling the power supply in the event of short circuit at the power source or in the case of an overcurrent by sensing a compensation voltage provided when sub-pixels incorporate a compensation circuit.

<Fourth embodiment>

Figure 29:
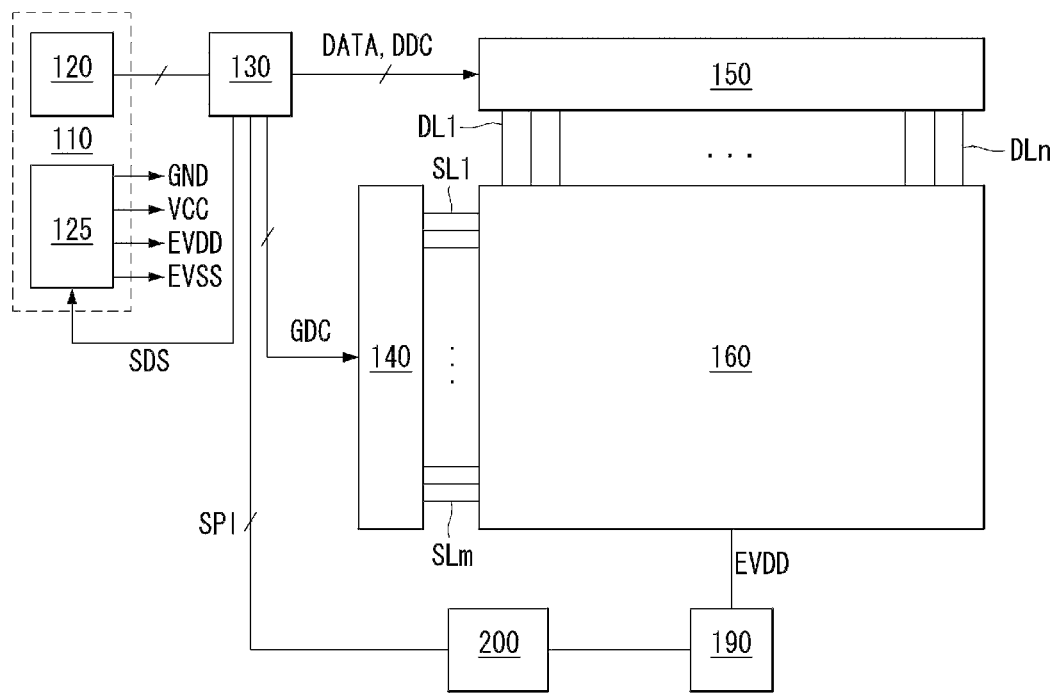
FIG. 29 is a block diagram of an organic light emitting display device according to a fourth embodiment of the present invention.

As shown in FIG. 29, an organic light emitting display device according to a fourth embodiment of the present invention comprises an image processing unit 120, a power supply 125, a timing controller 130, a data driving unit 150, a scan driving unit 140, a panel 160, a current sensing unit 190, and an analog-to-digital converter 200.

In case of the fourth embodiment, sub-pixels (SPs) included in the panel 160 may assume a structure incorporating a compensation circuit as described in the third embodiment or a conventional structure not incorporating the compensation circuit. However, for the current embodiment, a first power line wiring EVDD in the panel 160 is wired up separately for individual blocks. Since the image processing unit 120, the power supply 125, the data driving unit 150, and the scan driving unit 140 are configured to operate in the same way as the third embodiment, further description thereof will not be provided.

The current sensing unit 190 senses a current flowing through the first power line wiring EVDD wired up for individual blocks and amplifies the sensed currents of the individual blocks into the corresponding analog voltages and outputs the analog voltages.

The analog-to-digital converter 200 converts an analog voltage of each block provided from the current sensing unit 190 into the corresponding digital voltage and outputs the digital voltage.

The timing controller 130 receives a digital voltage of each block through communication with the analog-to-digital converter 200 and determines occurrence of a short-circuit or an overcurrent in the panel 160 by using the digital voltage of each block and in the event of a short-circuit or an overcurrent, generates an shutdown signal SDS for turning off the power supply 125. In what follows, it is assumed that a communication interface between the timing controller 130 and the analog-to-digital converter 200 employs SPI (Serial Peripheral Interface), which is a serial communication method.

Different from the third embodiment, the first power line wiring EVDD formed in the panel 160 of the fourth embodiment is wired up separately for individual blocks. And the timing controller 130 determines the occurrence of an overcurrent in the panel 160 through the current sensing unit 190 and the analog-to-digital converter 200 and in the event of an overcurrent, turns off the power supply 125.

Figure 30:
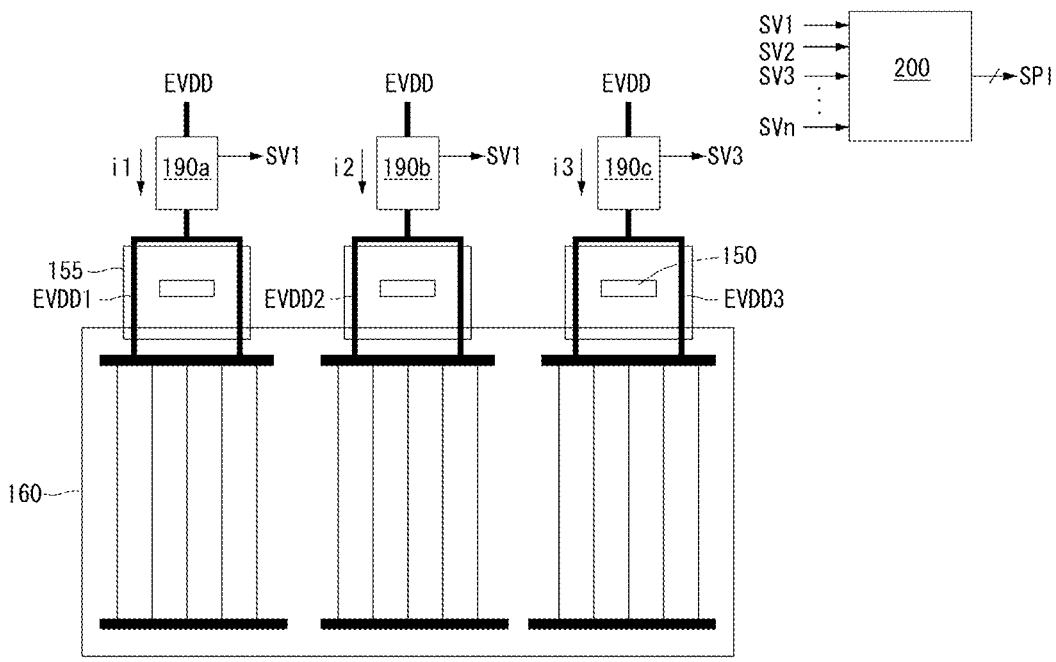
FIG. 30 illustrates a current sensing unit and an analog-to-digital converter of FIG. 29.

As shown in FIG. 30, the data driving unit 150 is implemented in the form of a plurality (for example, three) of integrated circuits (ICs) and installed on a plurality (for example, three) of first flexible printed circuit boards 155; the data driving unit 150 is attached to a pad unit of the panel 160 by employing the FOG method. Although not shown in the figure, the other end of the first flexible printed circuit board 155 is attached to a source circuit board.

The first power line wiring EVDD is split into a plurality of wiring (for example, three wirings) before it passes through the first flexible printed circuit board 155. Accordingly, the first power line wiring EVDD formed on the panel 160 is wired up separately for individual blocks. In what follows, it is assumed that the first power line wiring EVDD formed on the panel 160 is divided into a first to a third block power line wiring EVDD1~EVDD3.

The current sensing unit 190 comprises a first block current sensing unit 190a to a third block current sensing unit 190c. The first block current sensing unit 190a senses a first block current (i1) flowing through the first block power line wiring EVDD1 and amplifies the sensed current into a first block analog voltage SV1 and outputs the first block analog voltage SV1. The second block current sensing unit 190b senses a second block current (i2) flowing through the second block power line wiring EVDD2 and amplifies the sensed current into a second block analog voltage SV2 and outputs the second block analog voltage SV2. The third block current sensing unit 190c senses a third block current (i3) flowing through the third block power line wiring EVDD3 and amplifies the sensed current into a third block analog voltage SV3 and outputs the third block analog voltage SV3.

The first to the third block analog voltage SV1~SV3 sensed by the first block current sensing unit 190a to the third block current sensing unit 190c are provided to the analog-to-digital converter 200. The analog-to-digital converter 200 converts the first to the third block analog voltage SV1~SV3 into a first to a third block digital voltage. Here, the first to the third block digital voltage are provided to the timing controller 130 through a communication line (SPI) connecting the analog-to-digital converter 200 and the timing controller 130.

The first 190a to the third block current sensing unit 190c differ only in their sensing positions but have the same structure with each other. Therefore, in what follows, descriptions of the present invention will be provided by using the first block current sensing unit 190a as a representative of the three block current sensing units.

As shown in FIG. 31, the first block current sensing unit 190a comprises an amplifier OPR and resistors R1~R6. The first block current sensing unit 190a, being installed between the first power line wiring EVDD and the first block power line wiring EVDD1, senses a first block current (i1) flowing through the first block power line wiring EVDD1 and converts the sensed first block current (i1) into a first block analog voltage SV1 and outputs the first block analog voltage SV1.

When converting a current into the corresponding voltage, the first block current sensing unit 190a makes use of the voltages provided to a positive voltage terminal V+ and a negative voltage terminal V−. At this time, although a scan high voltage generated by the scan driving unit may be used as the voltage applied to the positive voltage terminal V+, the present invention is not limited to the above example.

Meanwhile, the embodiment in the figure assumed that the first block current sensing unit 190a consists only of an amplifier OPR and resistors R1~R6, capacitors or other passive elements may be further incorporated into the first block current sensing unit 190a.

One ends of the first and the second resistor R1, R2 are connected to the first power line wiring EVDD and the other ends are connected to the first block power line wiring EVDDL The third resistor R3 is connected between one ends of the first and the second resistor R1, R2 and a third terminal 3 of the amplifier OPR. The fourth resistor R4 is connected between one ends of the first and the second resistor R1, R2 and a first terminal 1 of the amplifier OPR. The fifth resistor R5 is connected between a second 2 and a third terminal 3 of the amplifier OPR and the ground wiring. The sixth resistor R6 is connected between the first 1 and a fourth terminal 4 of the amplifier OPR and the ground wiring. The second terminal 2 is connected to the negative voltage terminal V− of the amplifier OPR and the fifth terminal 5 is connected to the positive voltage terminal V+ of the amplifier OPR and a first block analog voltage SV1 is generated through the first terminal 1.

In the following, a process of outputting a shutdown signal will be described in conjunction with the analog-to-digital converter, the timing controller, and the power supply.

As shown in FIGS. 32 to 35, the analog-to-digital converter 200 and the timing controller 130 communicates commands through bus lines SDI, SCLK, SDO, CS included in the communication interface SPI. At this time, the timing controller 130 is selected as a master unit and the analog-to-digital converter is selected as a slave unit.

The timing controller 130 receives a first to an n-th block digital voltage SV1~SVn from the analog-to-digital converter 200 during a blank interval VB. The timing controller 130 receives digital voltages of individual blocks during at least two times of blank intervals and based on a difference value between the digital voltages, determines occurrence of a short-circuit or an overcurrent. To this purpose, the timing controller 130 comprises a determination unit 131 receiving digital voltages of individual blocks during at least two times of blank intervals VB and determines the difference between the digital voltages; and a shutdown signal generation unit 136 generating a shutdown signal SDS according to a result of the determination unit 131.

To be more specific, the determination unit 131 receives first digital voltages of individual blocks about the first to the n-th block digital voltage SV1~SVn from the analog-to-digital converter 200 during a first blank interval VB of "T1". Next, the determination unit 131 receives second digital voltages of individual blocks about the first to the n-th block digital voltage SV1~SVn from the analog-to-digital converter 200 during a second blank interval VB of "T2".

The determination unit 131 compares the first block digital voltage with the second block digital voltage and if a difference between the two voltages is zero, it is determined to be operating in normal conditions revealing no short-circuit or overcurrent. At this time, the determination unit 131 provides the shutdown signal generation unit 136 with either a signal of logic low or no signal at all. Therefore, the output terminal Vout of the power supply maintains its output.

On the other hand, if a difference between the first and the second block digital voltage shows non-zero value and exceeds a permissible range, the determination unit 131 determines that an abnormal state has occurred, revealing a short-circuit or an overcurrent in the panel. At this time, the determination unit 131 provides the shutdown signal generation unit 136 with a signal of logic high. Subsequently, the power supply stops its output terminal Vout and is turned off.

As a specific example, FIG. 35 illustrates a case where the first block digital voltage SV1 sensed during the second blank interval VB is larger than the first block digital voltage SV1 sensed during the first blank interval VB, exceeding a permissible range by a voltage value "Ab(V)".

Since the first block digital voltage SV1 sensed during the second blank interval VB exceeds the permissible range by the amount of voltage "Ab(V)", the shutdown signal generation unit 136 generates a shutdown signal SDS of logic high (H) instead of logic low (L). Subsequently, the power supply 125 stops the output terminal Vout and is turned off.

Meanwhile, the determination unit 131 and the shutdown signal generation unit 136 have been functionally separated in the above description for the convenience of understanding; therefore, the two units can be combined into a single unit in a different implementation. In addition, although the present invention assumes that the determination unit 131 and the shutdown signal generation unit 136 are incorporated into the timing controller 130, the two units can be implemented separately from the timing controller 130. Moreover, the permissible range introduced above can be configured differently according to the conditions of the panel, output voltage, and so on.

Figure 24:
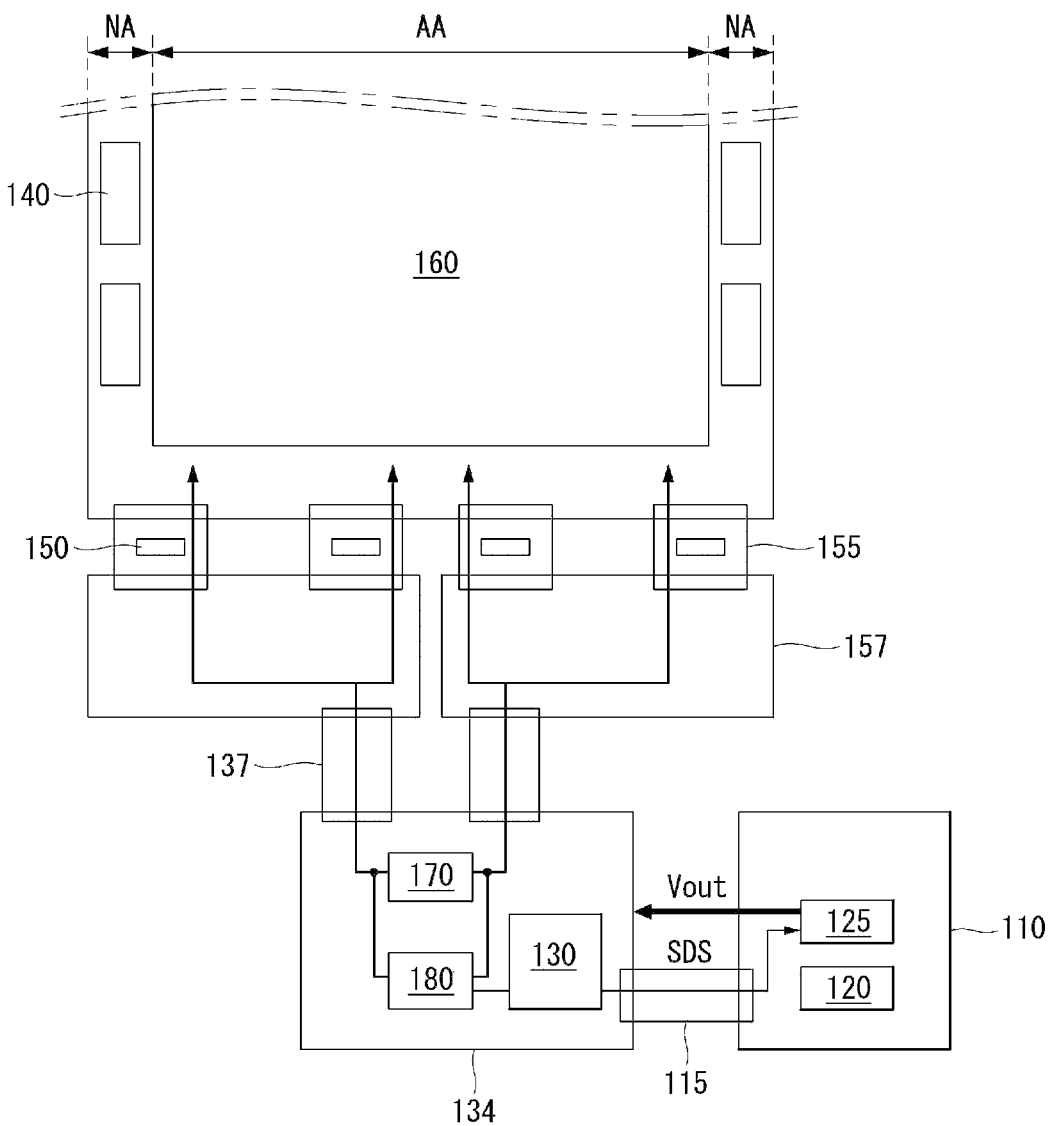
FIG. 24 illustrates an organic light emitting display device implemented by using constituting elements according to a third embodiment of the present invention.

Meanwhile, constituting elements according to the fourth embodiment can be used to implement an organic light emitting display device as in the third embodiment of FIG. 24. At this time, the current sensing unit 190 and the analog-to-digital converter 200 can be formed all in the control circuit board 134 or formed separately in the source circuit board 157 and the control circuit board 134.

Figure 36:
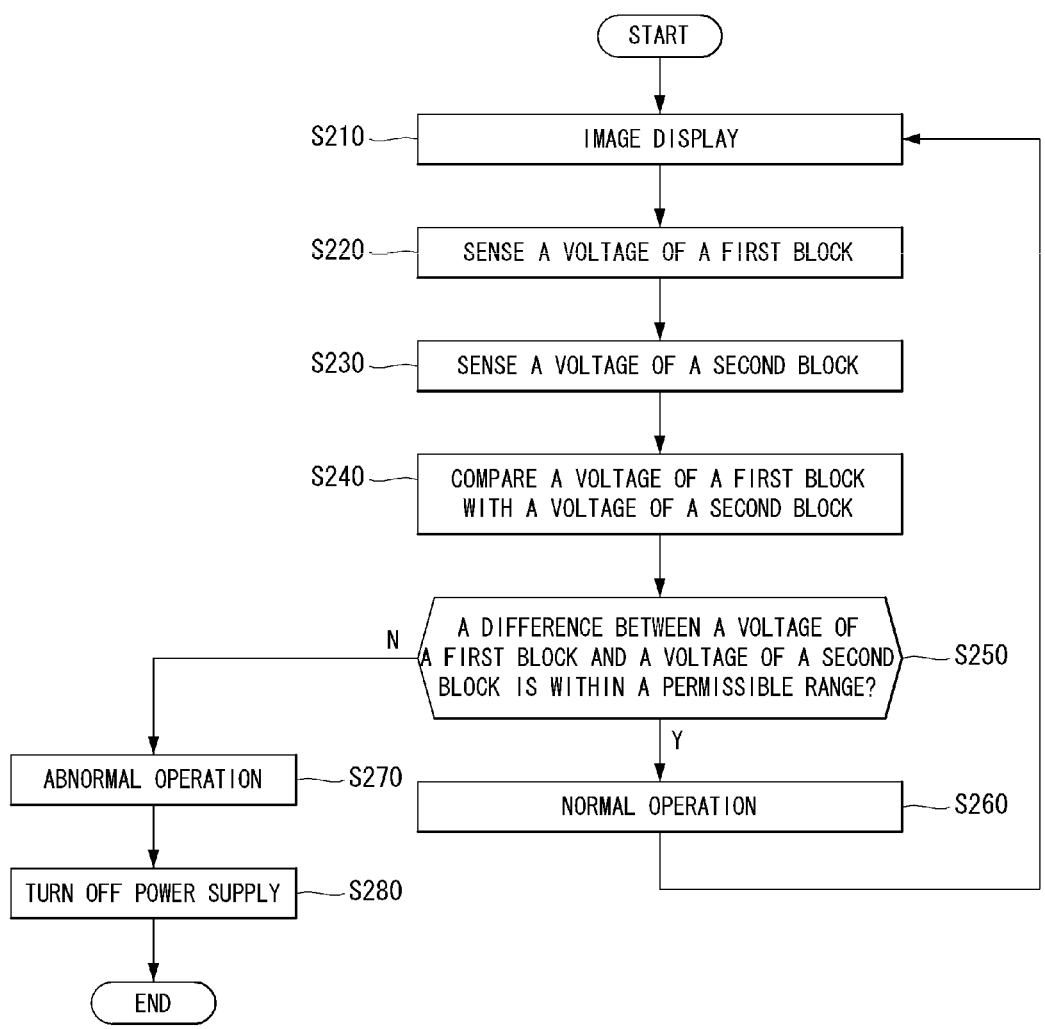
FIG. 36 is a flow diagram illustrating a method for operating an organic light emitting display device according to a fourth embodiment of the present invention.

In what follows, a method for operating an organic light emitting display device according to the fourth embodiment of the present invention will be described with reference to FIGS. 29 to 36; however, the operation method of FIG. 36 only represents methods utilizing one or more configurations described earlier but is not limited to the description.

First, the panel 160 displays an image S210. Next, a first block digital voltage is sensed through a first to a third block power line wiring EVDD1~EVDD3 wired up for individual blocks in the panel 160, S220. Next, a second block digital voltage is sensed through the first to the third block power line wiring EVDD1~EVDD3 wired up for individual blocks in the panel 160, S230. Then, the first block digital voltage is compared with the second block digital voltage S240. Next, it is determined whether a difference between the first and the second block digital voltage exceeds a permissible range S250. Next, if the difference between the first and the second block digital voltage falls within the permissible range Y, it is determined to be operating in a normal manner S260 and a shutdown signal SDS for turning off the power supply 125 which provides power to the panel 160 is not generated. Afterwards, the panel 160 continues to display images.

Different from the above, if a difference between the first and the second block digital voltage exceeds a permissible range N, it is determined to be operating in an abnormal manner S270 and a shutdown signal SDS for turning off the power supply 125 which provides power to the panel 160 is generated S280. Afterwards, the panel 160 stops displaying images.

As described above, the fourth embodiment of the present invention provides an organic light emitting display device and a method for operating the device, capable of sensing a current flowing through a first power line wiring wired up for individual blocks on the panel at least two times and comparing the sensed values with each other and controlling the power supply in the event of a short-circuit or an overcurrent at power terminals.

As described above, the present invention can provide an organic light emitting display device and a method for operating the device, capable of removing a possibility for a local burning out of an element to be spread to the whole system and to lead to a fire by using a circuit detecting short circuit or an overcurrent at power terminals.

What is claimed is:

1. An organic light emitting display device, comprising:
a panel;
a driving unit driving the panel;
a timing controller controlling the driving unit;
a power supply supplying power to the panel;
a current detection unit detecting a current flowing through power line wiring of the panel and outputting a detected current value; and
a power controller comparing the detected current value with an internally set current value and outputting a shutdown signal which turns off the power supply if the detected current value exceeds the predetermined current value,
wherein the timing controller periodically provides the panel with internally stored sensing data through the driving unit and provides the power controller with a sensing signal in order for the power controller to operate in synchronization with a timing at which the sensing data are displayed.

2. The organic light emitting display device of claim 1, wherein the timing controller provides the sensing signal to the power controller in order for the power controller to operate in blank intervals excluding an image display interval of the panel.

3. The organic light emitting display device of claim 1, wherein the current detection unit detects the current flowing through the power line wiring during which the sensing data are displayed on the panel.

4. The organic light emitting display device of claim 1, wherein the current detection unit detects the current flowing through the power line wiring for blank intervals excluding an image display interval of the panel.

5. The organic light emitting display device of claim 1, wherein the power controller comprises:
an analysis unit comparing the detected current value with the internally set current value and outputting a digital pulse if the values are different from each other, and
a shutdown signal generation unit generating the shutdown signal by using the digital pulse output from the analysis unit.

6. The organic light emitting display device of claim 1, wherein the sensing data corresponds to black data representing a black color.

7. A method of driving an organic light emitting display device, the method comprising:
displaying an image on a panel;
periodically providing the panel with internally stored sensing data and providing a sensing signal;
detecting a current flowing through power line wiring of the panel in synchronization with a timing at which the sensing data are displayed based on the provided sensing signal;
comparing the detected current with a current value configured internally; and
outputting a shutdown signal which turns off a power supply if the detected current value exceeds an internally set current value.

8. The method of claim 7, wherein the sensing signal is provided in black intervals excluding an image display interval of the panel.

9. The method of claim 7, wherein the current is detected for blank intervals excluding an image display interval of the panel.

10. The method of claim 7, wherein the outputting step comprises:
outputting a digital pulse if the detected current value and the internally set current value are different from each other; and
generating the shutdown signal by using the output digital pulse.

11. The method of claim 7, wherein the sensing data corresponds to black data representing a black color.

* * * * *